United States Patent
Yamasaki

(10) Patent No.: US 8,789,137 B2
(45) Date of Patent: Jul. 22, 2014

(54) DATA PROCESSING DEVICE

(75) Inventor: Shozo Yamasaki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 208 days.

(21) Appl. No.: 12/920,661

(22) PCT Filed: Mar. 6, 2009

(86) PCT No.: PCT/JP2009/001033
§ 371 (c)(1),
(2), (4) Date: Dec. 23, 2010

(87) PCT Pub. No.: WO2009/113286
PCT Pub. Date: Sep. 17, 2009

(65) Prior Publication Data
US 2011/0307642 A1     Dec. 15, 2011

(30) Foreign Application Priority Data
Mar. 13, 2008 (JP) .................................. 2008-064252

(51) Int. Cl.
*G06F 13/40* (2006.01)

(52) U.S. Cl.
USPC ........ 726/2; 726/4; 726/21; 713/165; 713/167

(58) Field of Classification Search
USPC .............................. 726/2, 4, 21; 713/165, 167
See application file for complete search history.

(56) References Cited

U.S. PATENT DOCUMENTS

| | | | |
|---|---|---|---|
| 7,707,418 B2 * | 4/2010 | Tsushima et al. ............. | 713/170 |
| 7,765,341 B2 * | 7/2010 | Corbett et al. .................. | 710/36 |
| 8,102,557 B2 * | 1/2012 | Chou et al. .................... | 358/1.16 |
| 2002/0174232 A1 | 11/2002 | Kikuta et al. | |
| 2006/0021063 A1 | 1/2006 | Hori | |
| 2007/0106894 A1 * | 5/2007 | Zhang et al. .................. | 713/170 |
| 2008/0288782 A1 * | 11/2008 | Iyer ............................... | 713/186 |
| 2009/0193266 A1 * | 7/2009 | Gable et al. .................... | 713/193 |

FOREIGN PATENT DOCUMENTS

| | | | |
|---|---|---|---|
| EP | 1640846 A2 | | 3/2006 |
| JP | 2002-344484 A | | 11/2002 |
| JP | 2003-186819 A | | 7/2003 |

(Continued)

OTHER PUBLICATIONS

Magid, Larry. "On a Home Network, the Right Drive Means Storage for All" Article dated Aug. 2, 2007 (3 pages). http://www.nytimes.com/2007/08/02/technology/circuits/02basics.html?pagewanted=a1l&_moc.semityn.www.*

(Continued)

*Primary Examiner* — Darren B Schwartz
*Assistant Examiner* — Thomas Gyorfi
(74) *Attorney, Agent, or Firm* — Canon U.S.A., Inc. IP Division

(57) ABSTRACT

When a data processing device is disconnected from a computer system after mutual authentication has been completed between the computer system and the data processing device, the data processing device cancels an authenticated state, and is not able to transfer data to a device other than a specific computer system. Therefore, even when the data processing device is connected to a device other than the specific computer system after the connection of a cable supporting hot swapping has been changed, the data processing device maintains the confidentiality of data.

14 Claims, 17 Drawing Sheets

(56) References Cited

FOREIGN PATENT DOCUMENTS

| | | |
|---|---|---|
| JP | 2006-060793 A | 3/2006 |
| JP | 2006-178836 A | 7/2006 |
| JP | 2006217551 A | 8/2006 |
| JP | 2007226620 A | 9/2007 |
| JP | 2008-017119 A | 1/2008 |
| JP | 2008017119 A | 1/2008 |

OTHER PUBLICATIONS

"Linksys by Cisco Simultaneous Dual-N Band Wireless Router Model WRT610N (EU) User Guide" © 2008 Cisco Systems Inc. (pp. 1-64) http://www.airospot.net/WRT610N-userguide.pdf.*

"can I Hot-Swap Ethernet?" forum postings between Mar. 11, 2004-Apr. 15, 2004 at soft32.com (4 pages total) http://forum.soft32.com/mac/Hot-Swap-Ethernet-ftopict32426.html.*

* cited by examiner

FIG. 6

| COMMAND NAME | TYPE |
|---|---|
| GET STATUS | NON DATA |
| INSTALL | WRITE |
| VERSION INFORMATION | READ |
| CHANGE NORMAL | NON DATA |
| CHANGE INTERCEPT | NON DATA |
| ⋮ | ⋮ |
| SEND CHA1 | WRITE |
| REQUEST RES1 | READ |
| REQUEST CHA1 | READ |
| SEND RES2 | WRITE |

FIG. 7

| COMMAND NAME | TYPE |
|---|---|
| RECALIBRATE | NON DATA |
| SEEK | NON DATA |
| EXECUTIVE DEVICE DIAGNOSTIC | NON DATA |
| ⋮ | ⋮ |
| READ DMA | DMA |
| WRITE DMA | DMA |
| ⋮ | ⋮ |
| FLUSE CACHE | NON DATA |
| IDENTIFY DEVICE | READ |
| SET FEATURES | WRITE |

DATA PROCESSING DEVICE

TECHNICAL FIELD

The present invention relates to a data processing device that is to be connected to a computer system as an external device, and, more particularly, to a data processing device that aims to maintain the confidentiality of data.

BACKGROUND ART

There are various types of peripheral devices (such as hard disk drives (HDDs), compact discs recordable (CD-Rs), compact discs rewritable (CD-RWs), digital versatile discs recordable (DVD-Rs), and digital versatile discs rewritable (DVD-RWs)) that are to be connected to computer systems using interfaces (including an integrated drive electronics (IDE) interface, a small computer system interface (SCSI), a universal serial bus (USB), an IEEE1394 interface, and so forth) as external devices.

Among such peripheral devices, there is a peripheral device that is required to have a function of controlling data communication only between the peripheral device and a specific computer system.

In order not to read confidential information or copyright data that is stored in such a peripheral device by using a different computer system, the peripheral device supports the function by performing a mutual authentication process between a specific computer system and the peripheral device. In this case, only when the authentication process is completed, data access between the computer system and the peripheral device can be performed.

For example, Japanese Patent Laid-Open No. 2003-186819 concerns a computer system including a USB device that has a security function. An authentication process is performed between the computer system and the USB device, and, only when the authentication process is completed, the USB device can be used. This avoids unauthorized use of the USB device in a case in which a malicious person connects the USB device to a different computer.

Additionally, in contrast, an encryption device that encrypts data which is to be stored in a peripheral device such as an HDD is known.

Patent Citation 1: Japanese Patent Laid-Open No. 2003-186819

DISCLOSURE OF INVENTION

Technical Problem

However, when an interface between a computer system and a peripheral device supports hot swapping, a connection cable can be plugged or unplugged while power is on in the computer system. Examples of the interface supporting hot swapping include the USB, the IEEE1394 interface, and a serial Advanced Technology Attachment (SATA). Accordingly, after an authentication process is completed, the cable can be unplugged in a state in which power is on in both the computer system and the peripheral device. When the cable is connected to a different computer system, data can be accessed using the different computer system without another performance of the authentication process. Thus, there is a risk of unauthorized use of the peripheral device with the different computer system.

FIG. 17 is a diagram showing an example of connection change of an interface supporting hot swapping. A data encryption device 102 is provided between a computer system 101 and an external storage device 103 (for example, an HDD). The data encryption device 102 encrypts data that the computer system 101 is to be written into the external storage device 103, and decrypts data that the computer system 101 is read from the external storage device 103. It is supposed that the interface 104 is disconnected from the computer system 101 and connected to a different computer system 1601 so that the different computer system 1601 is connected to the data encryption device 102 from a state in which the interface 104 connects the computer system 101 and the data encryption device 102. When the interface 104 is an interface (for example, a parallel ATA) that does not support hot swapping, the data encryption device 102 and the different computer system 1601 that are connected to each other after the connection of the interface 104 has been changed are not able to send and receive data. Accordingly, in this case, typically, it is necessary to turn off and on power in the devices again. When the data encryption device 102 is designed so as to authenticate a computer system when power is turned on, the different computer system 1601 that is not the proper destination of connection is not authenticated by the data encryption device 102. Thus, this prevents the data encryption device 102 from decrypting encrypted data that is stored in the external storage device 103, and from transferring the decrypted data to a different computer system. The SATA, with which data can be transferred at a speed that is higher than that of the parallel ATA of the related art, has become the mainstream. However, when the interface 104 is the SATA supporting hot swapping, data can be received and sent between the data encryption device 102 and the different computer system 1601 as in the case of the computer system 101 that was previously connected. Even when a mechanism in which the data encryption device 102 authenticates a computer system in a case in which power is turned on is introduced, data can be sent and received between the data encryption device 102 and the different computer system 1601 while an authenticated state is being maintained. Thus, the encrypted data that is stored in the external storage device 103 can be decrypted by the data encryption device 102, and transferred to the different computer system 1601, which is not the proper destination of connection. It is difficult to maintain the confidentiality of data of the external storage device 103, and this leads to a security problem.

The present invention provides a data processing device that maintains the confidentiality of data even when the data processing device is connected to a device other than a specific computer system after the connection of a cable supporting hot swapping has been changed.

Solution to Problem

A data processing device according to an embodiment of the present invention is connected to an information processing device via a first interface, and is at least capable of processing data and of transferring the data to the information processing device. The data processing device includes an authentication unit configured to perform a process for authenticating the information processing device which is connected via the first interface; a control unit configured to control, in response to correct performance of authentication of the information processing device by the authentication unit, the data processing device so that transfer of data to the information processing device is enabled; a determination unit configured to determine a state of connection of the data processing device to the information processing device via the first interface; and a change unit configured to, on the basis of determination by the determination unit that the data processing device is not connected to the information processing device via the first interface, change to being in a state in which the authentication unit does not authenticate the information processing device.

Furthermore, a data processing device according to an embodiment is connected to an information processing device via a first interface, and is connected to a peripheral device via a second interface. The data processing device includes a control unit configured to control the data processing device so that the data processing device is able to operate in a normal mode, in which data that has been received from the peripheral device is processed and the data is transferred to the information processing device, or a blocking mode, in which transfer of data that has been received from the peripheral device to the information processing device is prohibited, as an operation mode of the data processing device; a determination unit configured to determine a state of connection of the data processing device to the information processing device via the first interface; and a change unit configured to change, on the basis of determination by the determination unit in the normal mode that the data processing device is not connected to the information processing device via the first interface, the operation mode of the data processing device from the normal mode to the blocking mode.

Further features of the present invention will become apparent from the following description of exemplary embodiments with reference to the attached drawings.

BRIEF DESCRIPTION OF THE DRAWINGS

FIG. 6 is an illustration of a table of extended commands.

FIG. 7 is an illustration of a table of ATA commands.

DESCRIPTION OF EMBODIMENTS

In this embodiment, a data encryption device will be described as one example of a data processing device.

An environment in which the data encryption device is used, a configuration of the data encryption device, and an operation for maintaining the confidentiality of data with the data encryption device will be described below.

<Environment in Which The Data Encryption Device Is Used>

Figure 1:
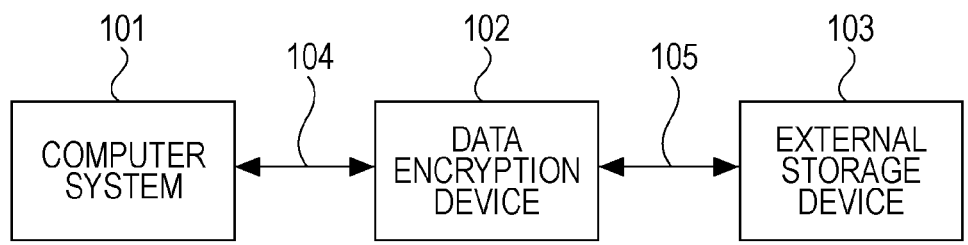
FIG. 1 is a diagram of the overall configuration of an encrypted data storage system.

FIG. 1 is a diagram of the overall configuration of an encrypted data storage system as an example of an environment in which the data encryption device is used.

Referring to FIG. 1, the data encryption device 102 is connected between the computer system 101 and the external storage device 103 via the interface 104 and an interface 105 serving as bridges.

The data encryption device 102, which is an example of a data processing device, encrypts data that is sent from the computer system 101, and transfers the encrypted data to the external storage device 103. Additionally, the data encryption device 102 decrypts data that is read from the external storage device 103, and transfers the decrypted data to the computer system 101.

The computer system 101, which is an example of an information processing device, is a device that controls a data encryption device, and may be an information processing device such as a personal computer, or a device such as a banking system, a desktop publishing (DTP) system, or a multifunction printer (MFP). The computer system 101 is not limited to a specific device.

The external storage device 103, which is an example of a peripheral device, is a device that stores data, and may be an HDD, a storage device using a flash memory, a rewritable disc such as a CD-R, a CD-RW, a DVD-R, or DVD-RW, or the like. The external storage device 103 is not limited a specific type of external storage device. In this embodiment, the external storage device 103 is a storage device using a hard disk, and is referred to as an "HDD 103".

The interfaces 104 and 105 are interfaces having a function of hot plug-in and hot plug-out (hereinafter, referred to as "hot swapping" or "hot plugging"). With the function of hot swapping, a connection cable can be plugged or unplugged even while the power of a device is on. When an interface having the function of hot swapping is used, parts or cables can be exchanged while the power of a device is on. As schemes for the function of hot swapping, various schemes including, for example, a scheme for controlling an output driver to be set in a high-impedance state when a cable is plugged or unplugged in a live-line state have been proposed. However, it is only necessary that malfunction associated with communication is avoided using any one of the schemes, and the scheme is not limited to a specific scheme. As interfaces having the hot swapping function, the USB, the IEEE1394 interface, the SATA, and so forth are known. In this embodiment, although SATA is used as each of the interfaces 104 and 105, another type of interface that supports hot swapping may be used.

Note that the data encryption device 102 can operate in a mode in which an encryption function is disenabled. In this case, the computer system 101 and the HDD 103 are in a state that is the same as a state in which they are directly connected to each other using an interface having the hot swapping function. In this mode, even when the interface 104 is disconnected from the computer system 101 and is connected to a different computer system while the power is on in both of the computer systems, the HDD 103 can correctly operate.

<Configuration of Data Encryption Device>

Figure 2:
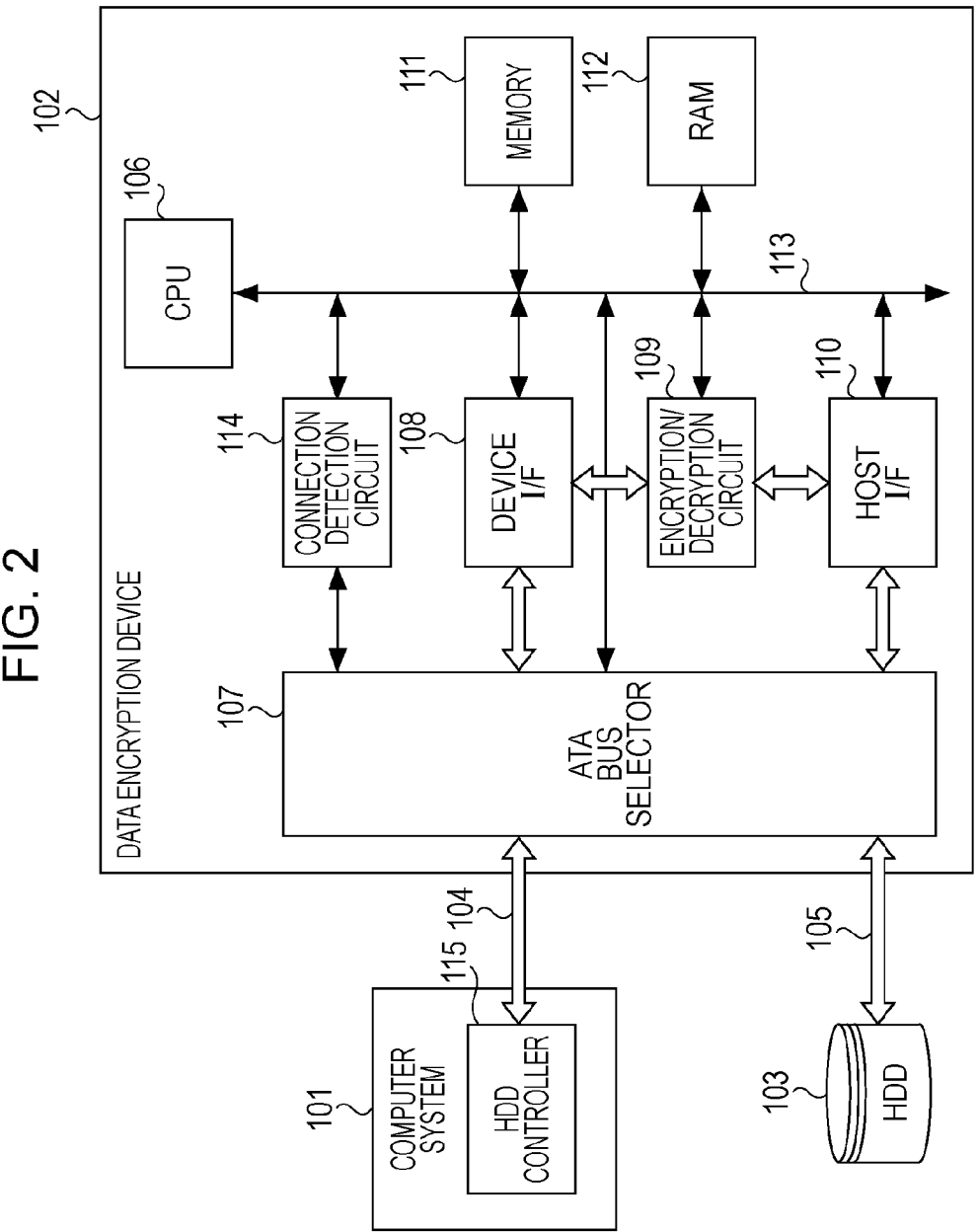
FIG. 2 is a block diagram of a hardware configuration of a data encryption device.

In FIG. 2, an example of a hardware configuration of the data encryption device 102 is shown. The data encryption device 102 shown in FIG. 2 is disposed so that it is inserted between an HDD controller 115, which is provided in the computer system 101, and the HDD 103. The computer system 101 has a central processing unit (CPU), a random-access memory (RAM), a read-only memory (ROM), a user interface, and so forth, which are not illustrated. The HDD controller 115 of the computer system 101 and the data encryption device 102, and the data encryption device 102 and the HDD 103 are connected to each other using the SATA buses 104 and 105 that are buses for the SATA which is a communication specification of an HDD, respectively. Data transfer and communication are performed using the SATA buses 104 and 105. The data encryption device 102 interprets a command and data which are to be sent from the HDD controller 115 to the HDD 103, and performs a process of encrypting data that is to be stored in the HDD 103, and a process of decrypting data that is read from the HDD 103.

Internal units of the data encryption device 102 are broadly classified into units that perform communication with the HDD controller 115 and the HDD 103, and that perform data encryption and decryption, and units that control the data encryption device 102.

The CPU 106 exercises overall control of the data encryption device 102, and stores a control program and data for the CPU 106 in a memory 111. Furthermore, seed information (described below) that is necessary in order to generate key information, unique information, and the key information (described below) that is necessary in order to encrypt data can be stored. In this embodiment, a battery-protected RAM, a flash memory, or the like is used as the memory 111. Even when the power of the data encryption device 102 is turned off, the storage contents in the memory 111 can be maintained. A RAM 112 is used as a work region of the CPU 106.

An ATA bus selector 107 is an interface between the HDD controller 115 and the HDD 103, and performs control of connecting the HDD controller 115 with the HDD 103 in accordance with operation modes that are described below.

A device interface 108 is connected to the HDD controller 115 via the ATA bus selector 107 while a normal operation is being performed. The device interface 108 operates the same as the HDD 103 operates so that the HDD controller 115 does not need to notice the existence of the device interface 108. A command that the HDD controller 115 issues is received by the device interface 108 once. When it is determined by the CPU 106 that the command is executable, the command is issued by the CPU 106 to the host interface 110, and sent to the HDD 103.

When data is to be stored in the HDD 103, the device interface 108 causes the encryption/decryption circuit 109 to encrypt data that has been received from the HDD controller 115, and transports the data to HDD 103. Furthermore, the device interface 108 causes the encryption/decryption circuit 109 to decrypt data that is read from the HDD 103, and transfers the data to the HDD controller 115 via the SATA bus 104. The device interface 108 also generates control data for this case.

The encryption/decryption circuit 109 encrypts data that is to be stored in the 103, and decrypts data that is read from the HDD 103. As a data decryption algorithm, secret key cryptography, such as data encryption standard (DES), triple DES (3DES), or advanced encryption standard (AES), public key cryptography, such as RSA, a hybrid scheme that is a combination of the secret key cryptography and the public key cryptography, or the like can be used. Because a scheme that does not depend on an encryption algorithm is employed in the embodiment of the present invention, an encryption algorithm that is used in the embodiment of the present invention is not limited to a specific encryption algorithm Moreover, in this embodiment, although the encryption/decryption circuit 109 is implemented using dedicated hardware, the CPU 106 may perform the encryption/decryption process using a software process.

The host interface 110 is connected to the HDD 103 via the ATA bus selector 107. The host interface 110 performs operations that are similar to those performed by the device interface 108, and performs transfer of a command to the HDD 103, generation of control data, and transfer of data between the encryption/decryption circuit 109 and the HDD 103.

The connection detection circuit 114 detects disconnection of the SATA bus 104 between the computer system 101 and the data encryption device 102 while the power of the computer system 101 is on. The connection detection circuit 114 determines a state of connection of the SATA bus 104 on the basis of a signal for detecting communication via the SATA bus 104 in the ATA bus selector 107, and notifies the CPU 106 of a result of determination.

Additionally, each block that is provided in the data encryption device 102 is connected to an address/data bus 113, and is controlled by the CPU 106.

<Operation Modes>

Next, operation modes of the data encryption device 102 will be described below.

Figure 3:
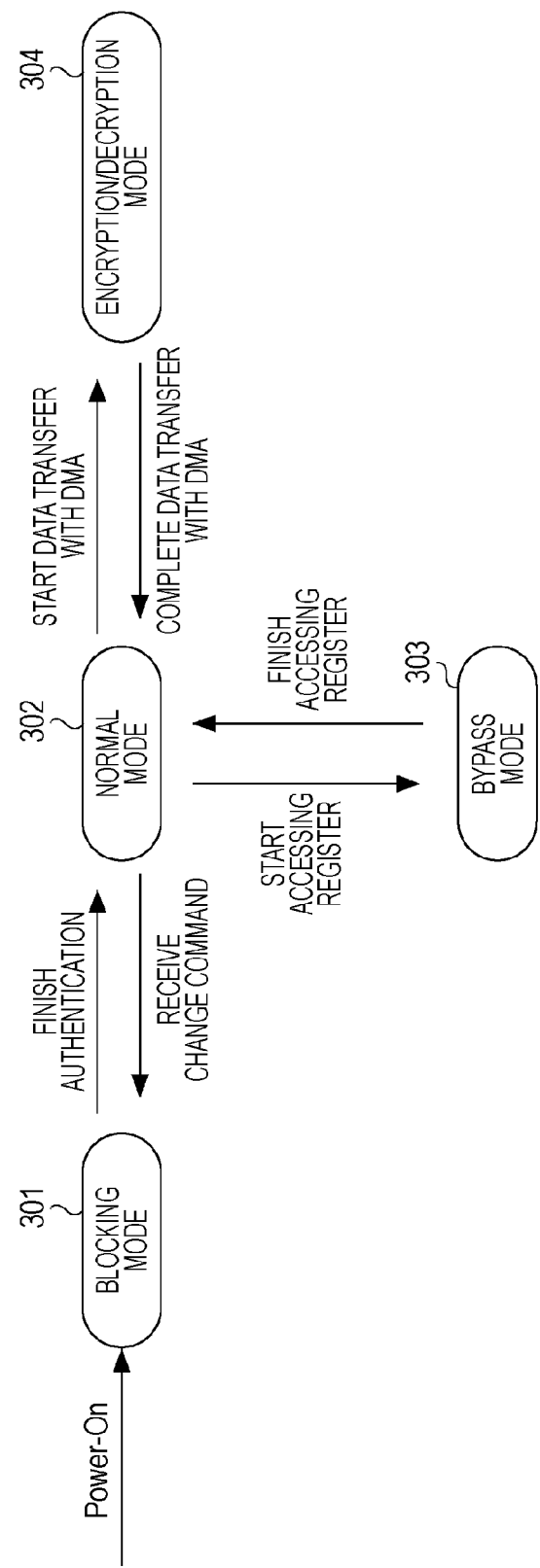
FIG. 3 is a diagram for explaining operation modes of the data encryption device.

FIG. 3 is a diagram for explaining the operation modes of the data encryption device 102.

The operation modes of the data encryption device 102 are broadly classified into two types, a blocking mode 301 and a normal mode 302. Furthermore, the operation mode of the data encryption device 102 changes from the normal mode 302 to one of two types of operation modes, a bypass mode 303 and an encryption/decryption mode 304, by using a command of the normal mode 302 while processing is performed. Setting of each of the operation modes and switching between the operation modes are performed under control that is performed by the CPU 106 of the data encryption device 102. Each of the operation modes will be described below.

Blocking Mode

When the power of the data encryption device 102 is turned on, first, the data encryption device 102 is set to be in the blocking mode 301. In the blocking mode 301, the data encryption device 102 is controlled so that any access by the HDD controller 115 to the HDD 103 is blocked.

When the HDD controller 115 tries to access the HDD 103, i.e., tries to access (tries to read/write data from/into) a register (not illustrated) that is provided in the HDD 103, actually, the HDD controller 115 accesses the data encryption device 102, and any access from the HDD controller 115 to the HDD 103 is blocked.

Additionally, only extended commands, which are newly defined, other than normal commands that the HDD controller 115 uses in order to access the HDD 103 can be used in the blocking mode 301.

In the blocking mode 301, only an authentication process that is performed between the computer system 101 and the data encryption device 102 can be performed. In other words, the data encryption device 102 prohibits transfer of data that was read from the HDD 103, and permits transfer of data that is necessary in order to perform the authentication process, thereby imposing limitations on transfer of data to the computer system 101.

In the authentication process, the data encryption device 102 authenticates the computer system 101. The authentication process that is performed in this embodiment will be described below.

Only when the authentication process finishes, the operation mode changes to the normal mode 302.

Whether or not a command that the HDD controller 115 issues is executable is defined in a program that is stored in the memory 111 of the data encryption device 102. The command that the HDD controller 115 issues is received by the device interface 108 via the ATA bus selector 107 shown in FIG. 2, and recognized by the CPU 106 via the address/data bus 113. The CPU 106 compares the command with reference data that is included in the program stored in the memory 111, and determines whether or not the command is executable.

Normal Mode

In the normal mode 302, the HDD controller 115 can access the HDD 103.

However, the data encryption device 102 checks every command that the HDD controller 115 issues, and only an executable command is transferred to the HDD 103. When the CPU 106 of the data encryption device 102 determines that a command is not executable, the command is blocked in the data encryption device 102, and is not transferred to the HDD 103.

Determination of whether or not a command is executable is performed as in the case of the blocking mode 301. Reference data for each of the operation modes is stored in the memory 111. The CPU 106 compares the reference mode with an accepted command, and determines whether or not the command is executable.

In the normal mode 302, when it is determined by the CPU 106 that a command is executable, the command is transferred to the HDD 103 via the host interface 110 and the ATA bus selector 107.

Next, when the data encryption device 102 receives a register access command that the HDD controller 115 uses in order to access a register (not illustrated) of the HDD 103, the operation mode changes to the bypass mode 303. The details of the bypass mode 303 will be described below.

The data encryption device 102 receives, from the HDD controller 115, a direct memory access (DMA) command to store data in the HDD 103 and to read data from the HDD 103, the operation modes changes to the encryption/decryption mode 304. When DMA transfer finishes, the operation mode changes from the encryption/decryption mode 304 to the normal mode 302.

Furthermore, when the data encryption device 102 receives an extended command (a change command), which is particularly defined, in the normal mode 302, the operation mode changes to the blocking mode 301.

Moreover, when the connection detection circuit 114 detects disconnection of the SATA bus 104 in the normal mode 302, the operation mode changes to the blocking mode 301. In the blocking mode 301, the authentication process is performed between the computer system 101 and the data encryption device 102 again.

Bypass Mode

The bypass mode 303 is a mode that is performed in order to access a register of the HDD 103 in the normal mode 302. In the bypass mode 303, the HDD controller 115 has a bypass to access a register of the HDD 103. In the bypass mode 303, the HDD controller 115 can write various setting values into registers of the HDD 103, whereby the HDD controller 115 can set settings for the HDD 103.

After the HDD controller 115 finishes transferring data to a register of the HDD 103 (after the HDD controller 115 finishes accessing a register of the HDD 103), the operation mode changes to the normal mode 302.

Encryption/Decryption Mode

In the encryption/decryption mode 304, when data is to be transferred from the HDD controller 115 to the HDD 103 with DMA transfer, the data is encrypted. Additionally, when data that is read from the HDD 103 is to be transferred to the HDD controller 115, the data is decrypted.

Data encryption and decryption are performed using an encryption key that is described below. When the data encryption device 102 is installed into the computer system 101 for the first time (when the data encryption device 102 is connected to the computer system 101 via the SATA bus 104 for the first time), generation of an encryption key that is described below is performed.

As the data decryption algorithm, secret key cryptography, such as AES, public key cryptography, such as RSA, a hybrid scheme that is a combination of the secret key cryptography and the public key cryptography, or the like can be used. When DMA transfer is completed, the operation mode changes to the normal mode 302.

<Configuration of ATA Bus Selector>

Figure 4:
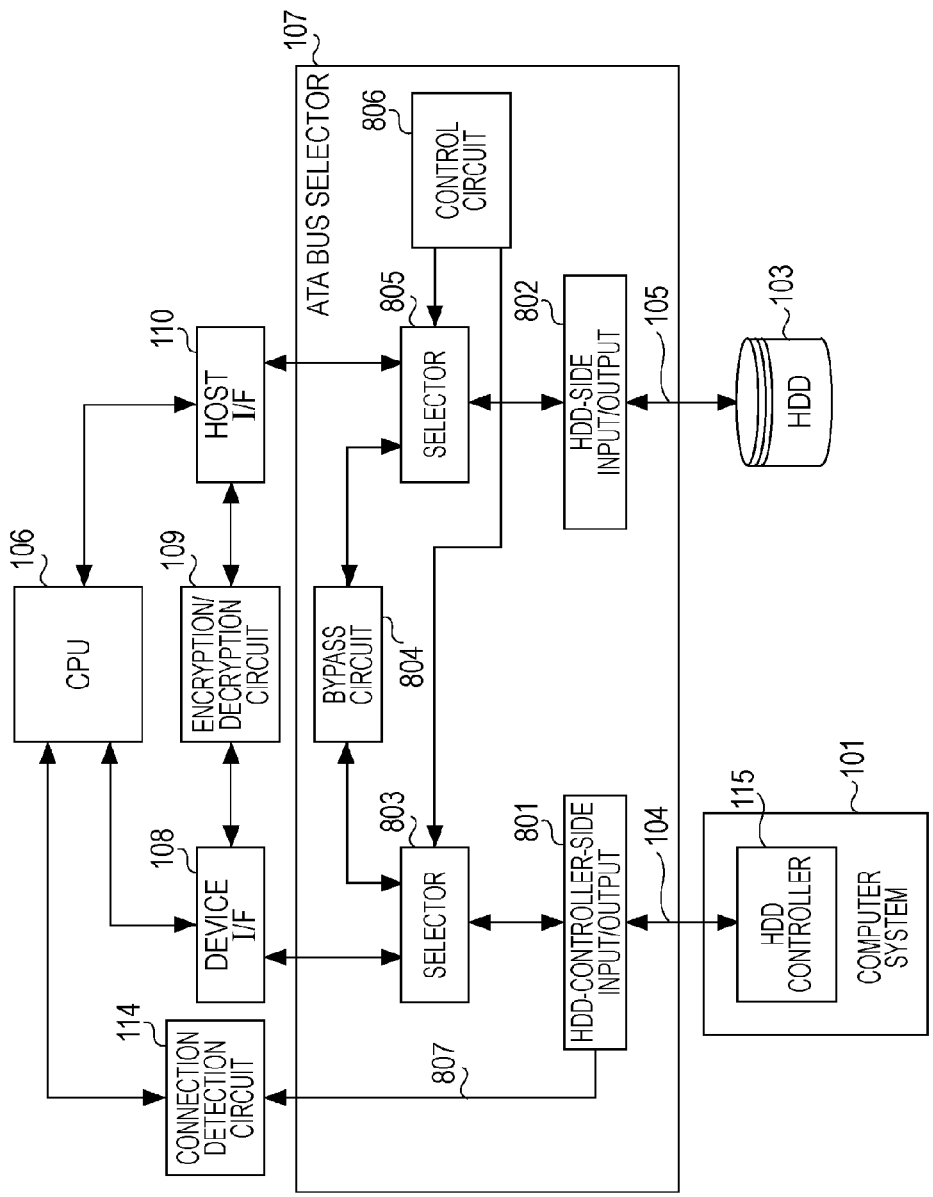
FIG. 4 is a block diagram of a hardware configuration of an ATA bus selector.

FIG. 4 is a block diagram of a hardware configuration of the ATA bus selector 107.

The HDD controller 115 is connected to an HDD-controller-side input/output 801 to input and output a signal. Additionally, the HDD 103 is connected to an HDD-side input/output 802.

When the HDD-controller-side input/output 801 is connected to the device interface 108 or a bypass circuit 804 via a selector 803.

Similarly, the HDD-side input/output 802 is connected to the host interface 110 or the bypass circuit 804 via a selector 805.

Each of the selectors 803 and 805 is controlled by the CPU 106 via a control circuit 806.

The HDD controller 115 and the HDD 103 can be connected to each other via the bypass circuit 804. Data can be transferred between the HDD controller 115 and the HDD 103 via the encryption/decryption circuit 109. The HDD controller 115 and the HDD 103 can be connected to each other via the CPU 106.

The connection detection circuit 114 is connected to the HDD-controller-side input/output 801. When the connection detection circuit 114 detects disconnection of the SATA bus 104, the connection detection circuit 114 notifies the CPU 106 of a result of detection. The HDD-controller-side input/output 801 includes an interface control circuit (not illustrated) for the SATA bus 104. Communication via the SATA bus 104 is accepted in a physical layer of the interface control circuit, and initialization of the physical layer finishes. When it becomes possible to perform communication via the SATA bus 104, the interface control circuit notifies the connection detection circuit 114 of a state in which communication via the SATA bus 104 can be performed. The details of operations of the connection detection circuit 114 will be described below.

<Operations of ATA Bus Selector>

An operation of the ATA bus selector 107 that is performed by the CPU 106 in each of the operation modes will be described with reference to a corresponding one of FIGS. 5A to 5C.

Figure 5A:
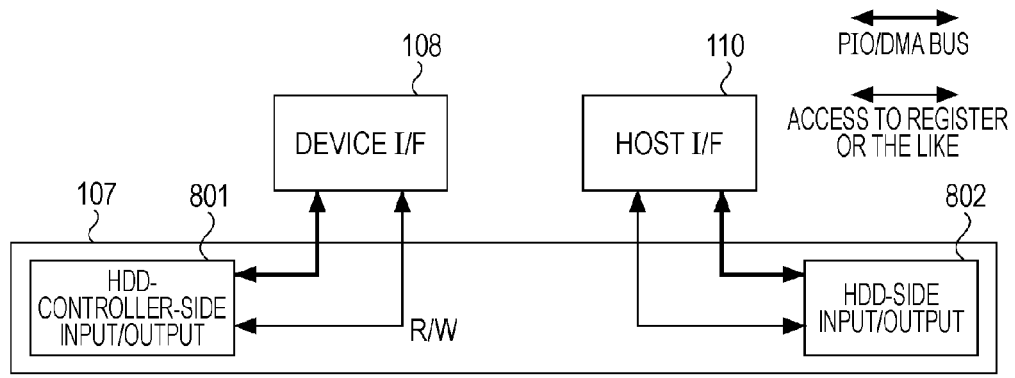
FIG. 5A is a diagram illustrating an operation of the ATA bus selector.
Figure 5B:
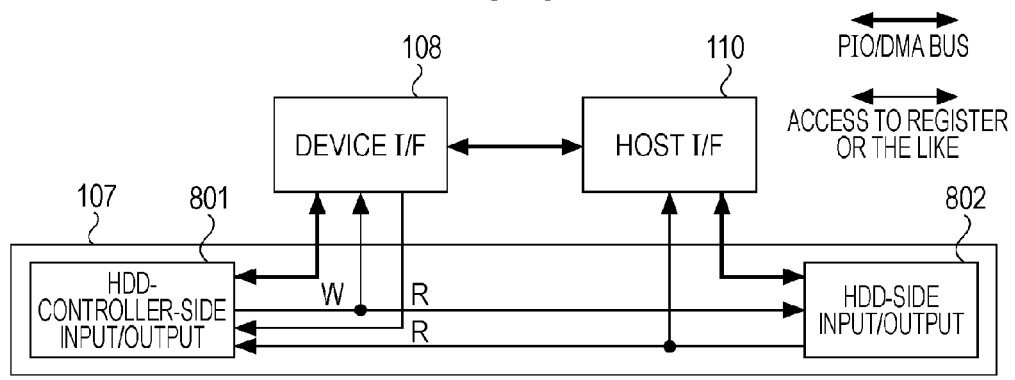
FIG. 5B is a diagram illustrating an operation of the ATA bus selector.
Figure 5C:
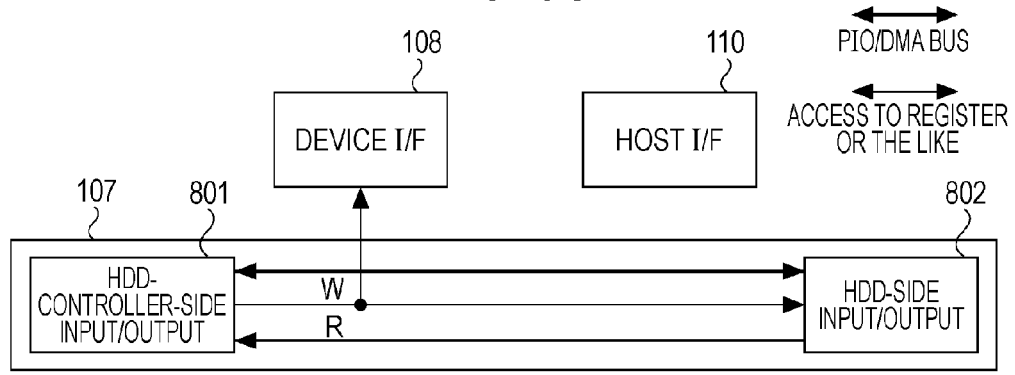
FIG. 5C is a diagram illustrating an operation of the ATA bus selector.

Each of FIGS. 5A to 5C is a diagram illustrating an operation of the ATA bus selector 107. In each of FIGS. 5A to 5C, arrows indicate connection relationships of data buses and transfer directions in a corresponding one of the operation modes. Tick lines indicate programmed input/output (PIO)/DMA buses that are used to send/receive data. Thin lines indicate accesses to registers (not illustrated) or the like, for example, that are used to set an operation of the HDD 103 and to check a status and that are provided in the HDD 103 or the data encryption device 102.

Blocking Mode Shown in FIG. 5A

In the blocking mode 301, the HDD-controller-side input/output 801 that is provided in the ATA bus selector 107 is connected to the device interface 108. The HDD-side input/output 802 is connected to the host interface 110. Accordingly, until authentication of the computer system 101 (or the HDD controller 115) that is performed by the data encryption device 102, which is described blow, finishes, the data encryption device 102 prohibits transfer of data from the HDD 103 to the HDD controller 115, and transfer of data from the HDD controller 115 to the HDD 103. Thus, any access from the HDD controller 115 to the HDD 103 is prohibited.

Normal Mode Shown in FIG. 5B

FIG. 5B shows the following: in the normal mode 302, the PIO/DMA buses are connected to the device interface 108 and the host interface 110; and, furthermore, regarding register access, the destination of access is changed for each register to be accessed.

FIG. 5B shows the following: when a write access to a register of the HDD 103 from the HDD controller 115 is issued (the thin line denoted by "W"), data is written only into a register that is provided in the device interface 108 by using an input/output signal on the HDD controller side in accordance with the type of register to be accessed; alternatively, the HDD controller 115 is directly connected to an input/output signal on the HDD side, and data is written only into the HDD 103; and otherwise, data is written into both the register that is provided in the device interface 108 and the HDD 103.

Similarly, in a case of read access to a register, FIG. 5B shows the following: data in a register that is provided in the HDD 103 is directly read; and alternatively, data that the host interface 110 has read can be read via the device interface 108.

Bypass Mode Shown in FIG. 5C

In the bypass mode 303, the HDD-controller-side input/output 801 and the HDD-side input/output 802 are directly connected to each other. Regarding write accesses to some registers, the same data is written into both registers of the HDD 103 and registers that is provided in the device interface 108.

<Executable Extended Command>

FIG. 6 is an illustration of a table of extended commands in this embodiment. The extended commands shown in FIG. 6 are different from ATA commands that are used for normal accesses to the HDD 103, and can be processed only by the data encryption device 102 in the blocking mode 301. A program for interpreting the extended commands and for performing processes corresponding to the extended commands is stored in the memory 111 of the data encryption device 102.

A command name indicates the name of a command with which the data encryption device 102 can operate, and a type indicates a type of access. Commands of a NON-DATA transfer type do not involve writing or reading of data. Examples of commands of the Non-DATA transfer type include a command to check a status of the HDD 103, a command to change the operation mode from the blocking mode 301 to the normal mode 302, and so forth.

Commands of a WRITE or READ transfer type involve writing or reading of data. The commands are used to obtain version information and to perform a challenge for authentication.

<Executable ATA Commands>

FIG. 7 is an illustration of a table of ATA commands in this embodiment. The ATA commands shown in FIG. 7 are executable by the data encryption device 102 in the normal mode 302. The table of the ATA commands is stored in the memory 111 of the data encryption device 102. Furthermore, a program for performing processes corresponding to the ATA commands is also stored in the memory 111.

In this embodiment, commands that are executable to the HDD 103 by the HDD controller 115 are limited to the ATA commands shown in FIG. 7. The reason for this is that unnecessary access to the HDD 103 is avoided to ensure security.

When a command is issued by the HDD controller 115 in the normal mode 302, the command is temporarily maintained in the data encryption device 102. Whether or not the command is executable is checked. In other words, whether or not the command is included in the table shown in FIG. 7 is checked with reference to the memory 111. Only when the command is executable, the command is sent to the HDD 103. When it is determined that the command is not executable, the command is not sent to the HDD 103, and the HDD controller 115 is notified of the command as an error (an abort error).

<Authentication>

Next, authentication between the HDD controller 115 and the data encryption device 102 will be described.

There are two types of authentication processes: an authentication process in a case in which the data encryption device 102 is installed by connecting the data encryption device 102 to the HDD controller 115 for the first time (hereinafter, referred to as a "case of the initial installation"); and an authentication process after a case in which the power of the HDD controller 115 (that is included in the computer system 101) and the power of the data encryption device 102 are turned on after the initial installation is completed. The authentication processes are described below in this order.

Case of Initial Installation

Figure 8:
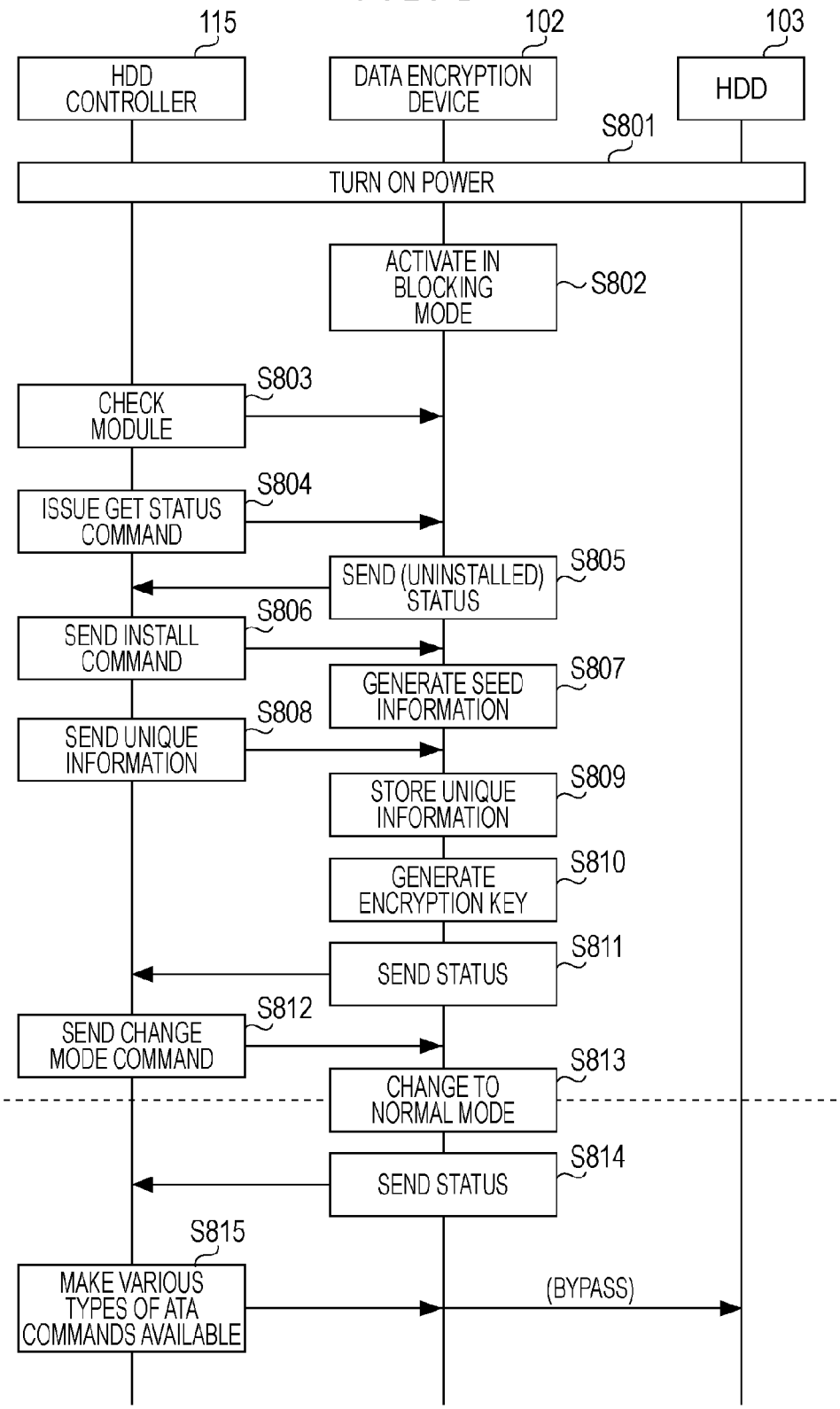
FIG. 8 is a diagram showing an example of a sequence for explaining an authentication procedure in a case of the initial installation.

FIG. 8 is a diagram showing an example of a sequence for explaining an authentication procedure in a case in which the data encryption device 102 is connected to the HDD controller 115 for the first time.

First, power is tuned on by a user operation in a state in which the data encryption device 102, the computer system 101 (that includes the HDD controller 115), and the HDD 103 are connected to each other via the SATA buses 104 and 105 (step S801), thereby activating the data encryption device 102, the computer system 101, and the HDD 103. The data encryption device 102 is activated in the blocking mode 301 (step S802). The HDD controller 115 sends a predetermined command on the SATA bus 104, and checks whether the data encryption device 102 is connected to the computer system 101 (step S803). The HDD controller 115 issues a GET STATUS command to the data encryption device 102 via the SATA bus 104 (step S804), and checks a status of generation of an encryption key with the data encryption device 102.

Because no encryption key has been generated in the data encryption device 102 in the case of the initial installation, the data encryption device 102 returns an uninstalled status to the HDD controller 115 (step S805).

The HDD controller 115 recognizes the uninstalled status, and sends an INSTALL command to the data encryption device 102 (step S806). The data encryption device 102 generates seed information (step S807). The HDD controller 115 sends unique information (step S808). The seed information and the unique information are used to generate an encryption key. In this embodiment, it is supposed that the unique information is information that is unique to the computer system 101. As another example of the unique information, information that is unique to the HDD controller 115 may be used. Furthermore, information that is obtained by combining the information which is unique to the HDD controller 115 with the information which is unique to the computer system 101 may be used as the unique information. The data encryption device 102 stores the received unique information in the memory 111 (step S809). The memory 111 is an example of an unique-information storage unit for storing unique information. Then, the data encryption device 102 generates an encryption key on the basis of the unique information that is generated in step S807 and the seed information, and writes the encryption key into the memory 111 (step S810). When generation of an encryption key and writing of the encryption key into the memory 111 are completed, the data encryption device 102 sends a status indicating the completion of generation and writing to the HDD controller 115 (step S811).

When the HDD controller 115 recognizes the completion of generation of an encryption key, the HDD controller 115 sends a CHANGE mode command to the data encryption device 102 (step S812). When generation of an encryption key finishes, the generation of an encryption key is regarded as an alternative process of authentication, and the operation mode changes to the normal mode 302 (step S813). The data encryption device 102 notifies the HDD controller 115 that the operation mode has changed to the normal mode 302 (step S814).

After that, in the normal mode 302, it becomes possible for the HDD controller 115 to access the HDD 103, and various types of ATA commands become available (step S815).

<Generation of Key Information>

Next, an operation of generating key information, which is performed using software by the CPU 106 of the data encryption device 102 in a case of authentication illustrated in FIG. 8, will be described below.

The data encryption device 102 receives, from the HDD controller 115, unique information that is unique to the HDD controller 115, or unique information that is unique to the computer system 101 in which the HDD controller 115 is mounted. The unique information is information that is unique to the individual computer system 101, and various types of information, such as a serial number, a media access control (MAC) address in a computer system having a local area network (LAN) interface (I/F), and information that is obtained by combining information concerning the serial number with information concerning the MAC address, can be used.

The CPU 106 generates key information from the unique information that has been received and seed information that is stored in the memory 111. In this embodiment, for example, a random number is used as the seed information. Examples of a method for generating key information from the unique information and the seed information include the following methods:

the exclusive OR of the unique information and the seed information is taken as the key information;

the unique information and the seed information are input to a one-way hash function, and the output of the one-way hash function is used as the key information;

the seed information is subjected to an encryption process using the unique information as a key of an encryption function, and the output of the encryption function is used as the key information;

the unique information is subjected to an encryption process using the seed information as a key of an encryption function, and the output of the encryption function is used as the key information; and key information is shared using the Diffie-Hellman (DH) key agreement method (RFC 2631).

However, because it is only necessary that only the data encryption device 102 store the key information, for example, the seed information may be used as a private key of the data encryption device 102 in the DH key agreement method, and the unique information may be used as information that is obtained using a public key of the data encryption device 102 and information unique to the computer system 100.

The methods described above are examples of a method for generating key information from unique information and seed information. Any two-input function representing "key information=f (seed information, unique information)" can be used in the method for generating key information in the embodiment of the present invention.

Furthermore, by managing key-information verification information together with key information, the validity of the key information can also be verified. A hash value that is calculated using the key information is considered as one example of the key-information verifying information.

Note that a method for generating seed information depends on the method for generating key information and the encryption algorithm. When a random number can be used as a key in the encryption algorithm, the seed information can also be generated as a random number or a pseudo-random number. In contrast, when information that satisfies a specific condition needs to be used as a key in the encryption algorithm, for example, it is necessary that key information be generated, and that seed information which satisfies "key information=f (seed information, unique information)" be obtained from the generated key information and the unique information.

Case of Normal Activation

Figure 9:
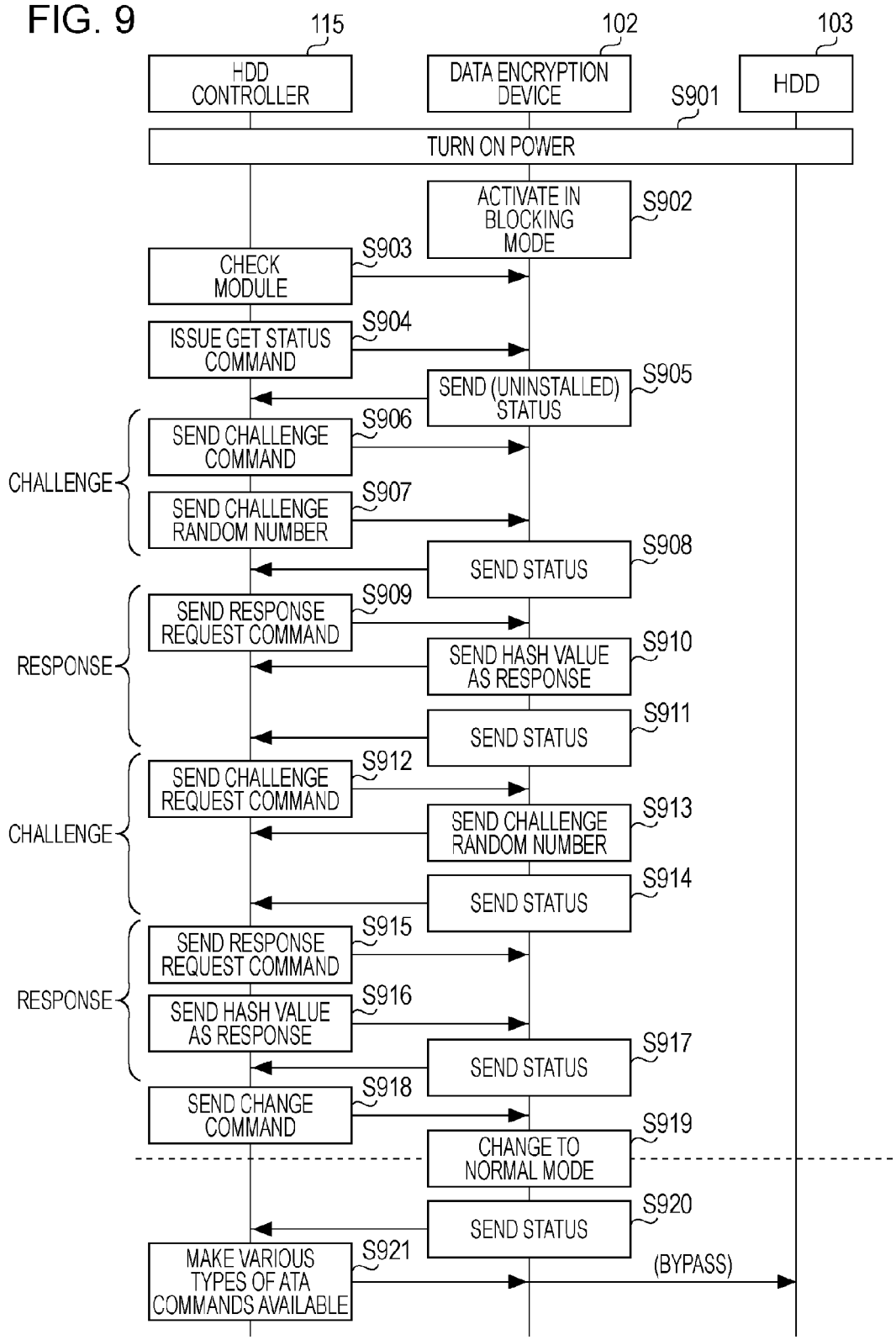
FIG. 9 is a diagram showing an example of a sequence for explaining an authentication procedure in a case of normal activation.

FIG. 9 is a sequence diagram showing an example of a sequence for authentication in a case of normal activation in which the data encryption device 102 has already been installed into the computer system 101.

First, power is turned on by a user operation in a state in which the data encryption device 102, the computer system 101, and the HDD 103 are connected to each other via the SATA buses 104 and 105 (step S901). The data encryption device 102 is activated in the blocking mode 301 (step S902).

The HDD controller 115 sends a predetermined command on the SATA bus 104, and checks whether the data encryption device 102 is connected to the computer system 101 (step S903). After that, the HDD controller 115 sends a GET STATUS command to the data encryption device 102 (step S904), and checks a status of generation of an encryption key with the data encryption device 102 (step S904). Because an encryption key has been generated in the data encryption device 102 in the case of normal activation, the data encryption device 102 returns, to the HDD controller 115, a response indicating that an encryption key has been installed (step S905). When the HDD controller 115 checks that an encryption key has been installed into the data encryption device 102, the HDD controller 115 proceeds to an authentication process.

It is supposed that the authentication process in this embodiment uses a challenge-and-response scheme that is known in the related art. In the challenge-and-response scheme, the computer system 101 including the HDD controller 115 and the data encryption device 102 authenticate each other. As a matter of course, another authentication scheme may be used.

First, the HDD controller 115 sends a challenge command indicating performance of a challenge to the data encryption device 102 (step S906), and then, sends a challenge random number (step S907). Here, the challenge random number is generated by the computer system 101 or the HDD controller 115, and is a numerical value that randomly changes every time authentication is performed and that is difficult to be predicted in advance.

When the data encryption device 102 receives the challenge random number, the data encryption device 102 returns a status indicating the completion of reception to the HDD controller 115 (step S908).

The HDD controller 115, which has received the status indicating the completion of reception from the data encryption device 102, sends a response request command to the data encryption device 102 (step S909).

When the data encryption device 102 receives the response request command from the HDD controller 115, the data encryption device 102 generates a hash value using the unique information that is stored in the memory 111 and the challenge random number that has been received. Then, the data encryption device 102 sends the generated hash value as a response to the HDD controller 115 (step S910), and returns a status indicating the completion of sending (step S911).

When the HDD controller 115 receives the response from the data encryption device 102, the computer system 101 generates a hash value by using the unique information that is stored in the computer system 101 and the challenge random number that was sent in step S906. Then, the computer system 101 compares the hash value with the response that was received from the data encryption device 102. As a result of comparison, when the hash value coincides with the response, the computer system 101 determines that the data encryption device 102 is the proper destination of connection, and proceeds to the next process of performing a challenge from the data encryption device 102 to the HDD controller 115.

First, the HDD controller 115 sends a command to request performance of a challenge to the data encryption device 102 (step S912).

The data encryption device 102 sends a challenge random number to the HDD controller 115 (step S913), and sends a status indicating the completion of sending of a challenge random number to the HDD controller 115 (step S914). Here, the challenge random number is generated by the data encryption device 102, and is a numerical value that randomly changes every time authentication is performed and that is difficult to be predicted in advance.

Next, the computer system 101 generates a hash value by using the stored unique information and the received challenge random number.

The HDD controller 115 sends a command to request a response to the data encryption device 102 (step S915), and sends the generated hash value as a response (step S916).

When the data encryption device 102 receives the response, the data encryption device 102 generates a hash value by using the unique information that is stored in the memory 111 (the unique information that is stored in step S809 shown in FIG. 8), and the challenge random number that the data encryption device 102 sent in step S913. Then, the data encryption device 102 compares the hash value with the response that was received from the HDD controller 115. As a result of comparison, when the hash value coincides with the response, the data encryption device 102 determines that the computer system 101 is the proper destination of connection, and finishes the authentication process (step S917).

The data encryption device 102 receives a change command to change the operation mode to the normal mode 302 from the HDD controller 115 (step S918). When the authentication process is correctly completed, the operation mode of the data encryption device 102 changes from the blocking mode 301 to the normal mode 302 (step S919), and the data encryption device 102 sends, to the HDD controller 115, a status indicating that the operation mode has changed to the normal mode 302 (step S920). Then, in step S921, various types of ATA commands become available in the normal mode 302.

<Command Sequence in Normal Mode>

Next, the detail sequence for commands that are executable in the normal mode 302 is shown. Commands that are executable in the normal mode 302 are shown in FIG. 7, and are classified by type of data transfer. There are three types, a NON-DATA transfer type, a READ transfer type, and a DMA transfer (encryption/decryption) type. The three types will be described in this order.

Command Sequence for NON-DATA Transfer Type

Performance of a command involves two steps. First, a parameter is set that is necessary in order to perform the command Data is written into a related register (a T/F register, which is also called an I/O register or a command block register and which is not illustrated) that is provided in a command block of the HDD 103. Next, a command code is written into a command register, whereby the HDD 103 practically performs the command (that is transferred to the data encryption device 102 once).

Furthermore, regarding some registers from among registers in which parameters are to be set and from among command registers into which command codes are to be written, the registers have different functions for a case in which data is written into the registers from the HDD controller 115 and for a case in which data is read from the registers. Examples of the registers include an ERROR/FEATURES register, a STATUS/COMMAND register, and so forth. Although errors or statuses are read as data from the registers, commands are performed when data is written into the registers.

Figure 10:
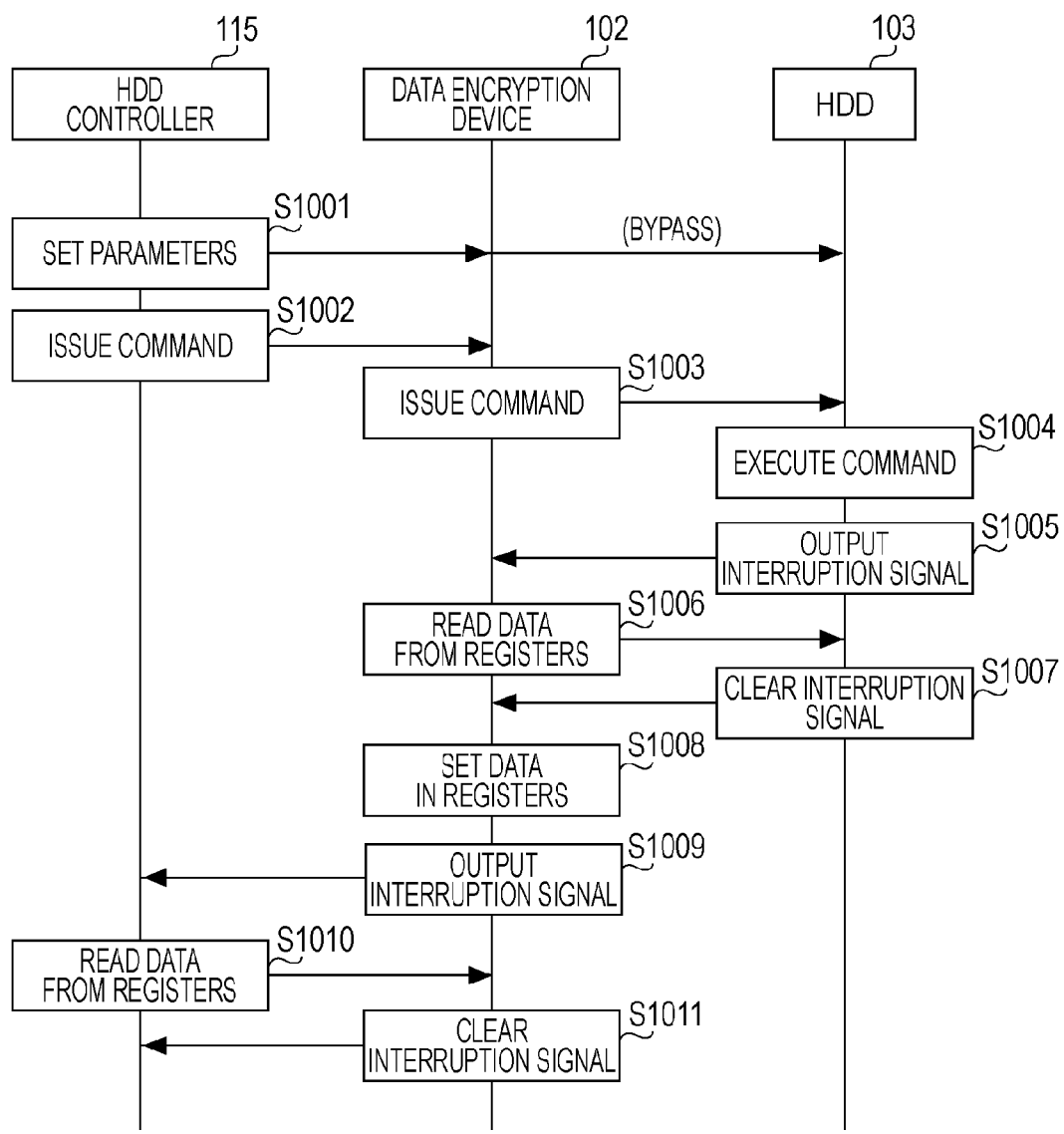
FIG. 10 is a diagram showing a sequence for commands of a NON-DATA transfer type.

FIG. 10 is a diagram showing a sequence for commands of the NON-DATA transfer type.

Examples of commands of the NON-DATA transfer type include a RECALIBRATE command, a SEEK command, and so forth.

The RECALIBRATE command is a command to perform a REZERO operation of the HDD 103, and the SEEK command is a command to select a seek or head of a designated track of the HDD 103.

First, in the normal mode 302, the HDD controller 115 sets a parameter in order to access the HDD 103. The parameter is set in both a register of the data encryption device 102 and a register of the HDD 103 (neither of which is illustrated) (step S1001).

Next, the HDD controller 115 issues a command that is to be executed to a command resister, and sets the command in a register of the device interface 108 of the data encryption device 102 (step S1002). The data encryption device 102 determines whether or not the command is executable. Only when the command is executable, the data encryption device 102 sets the command in a command register of the HDD 103 (step S1003). The table of executable commands is stored in the memory 111, and the data encryption device 102 determines in accordance with the table of executable commands whether or not the command is executable.

The HDD 103 executes the command (step S1004). When processing of the command finishes, the HDD 103 outputs an interruption signal to the data encryption device 102 (step S1005). The interruption signal is input only to the data encryption device 102, and the data encryption device 102 reads data from a status register and an error register of the HDD 103 (step S1006). When data is read from the registers, the HDD 103 clears the interruption signal (step S1007).

The data encryption device 102 sets the data that has been read from the status register and the error register of the HDD 103 in a status register and an error register of the data encryption device 102 (step S1008). Then, the data encryption device 102 outputs an interruption signal to the HDD controller 115 (step S1009). Because the interruption signal is input to the HDD controller 115, the HDD controller 115 reads data from the status register and the error register of the data encryption device 102 (step S1010). When reading of data by the HDD controller 115 is completed, the data encryption device 102 clears the interruption signal (step S1011). As described above, the sequence for the command of the NON-DATA transfer type and for processing the command ends.

Sequence for Commands of READ Transfer Type (PIO READ)

Figure 11:
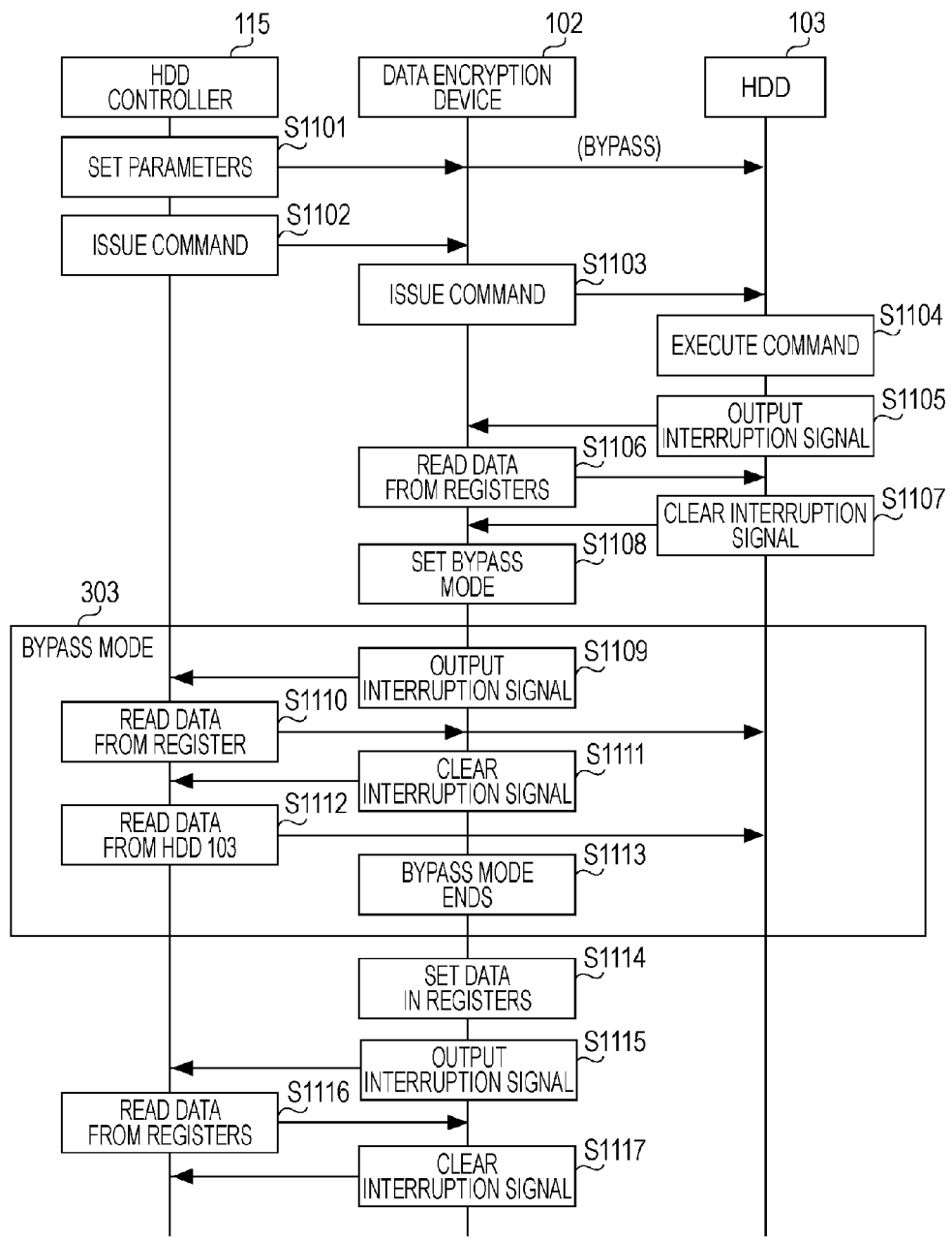
FIG. 11 is a diagram showing a sequence for commands of a READ transfer type.

FIG. 11 is a diagram showing a sequence for commands of the READ transfer type.

Examples of commands of the READ transfer type that are executable in the normal mode 302 include an IDENTIFY DEVICE command as shown in FIG. 7. When the IDENTIFY DEVICE command is executed, parameter information concerning the HDD 103 can be read. The parameter information may be information associated with the HDD 103, such as the number of cylinders, the number of heads, and a serial number, and is different from data that is written from the HDD controller 115 into the HDD 103.

Referring to FIG. 11, first, the HDD controller 115 sets parameters (step S1101). Then, when the HDD controller 115 issues a command of the READ transfer type (step S1102), the data encryption device 102 interprets the command, and transfers the command to the HDD 103 (step S1103), thereby issuing the command The HDD 103 executes the issued command (step S1104). When the issued command is the IDENTIFY DEVICE command, the HDD 103 sets requested parameter information in a sector buffer that is provided in the HDD 103, and writes a status for the command that was issued into the status resister of the HDD 103. Then, the HDD 103 outputs an interruption signal to the data encryption device 102 (step S1105).

The data encryption device 102 reads data from the status register of the HDD 103, and checks a status of the HDD 103 (step S1106). When data is read from the register, the HDD 103 clears the interruption signal (step S1107).

Then, the data encryption device 102 sets a setting for changing the operation mode to the bypass mode 303 (step S1108). When change of the operation mode to the bypass mode 303 is completed, the HDD 103 outputs an interruption signal to the HDD controller 115 (step S1109), and notifies the HDD controller 115 that the HDD 103 is ready.

The HDD controller 115 reads data from the status register of the HDD 103 (step S1110). The data encryption device 102 recognizes that the status register of the HDD 103 has been read, and clears the interruption signal (step S1111). Then, the HDD controller 115 reads data (the parameter information or the like) concerning the HDD 103 (step S1112).

When reading of a predetermined number of pieces of data is completed, the bypass mode 303 ends (step S1113). When the bypass mode 303 ends, the data encryption device 102 sets data in registers (step S1114). Then, the data encryption device 102 outputs an interruption signal to the HDD controller 115 (step S1115). The HDD controller 115 reads data from the registers of the data encryption device 102 (step S1116). When reading of data is completed, the data encryption device 102 clears the interruption signal (step S1117), and the series of processes ends.

Sequence for Commands of READ DMA/WRITE DMA Transfer Type

Figure 12:
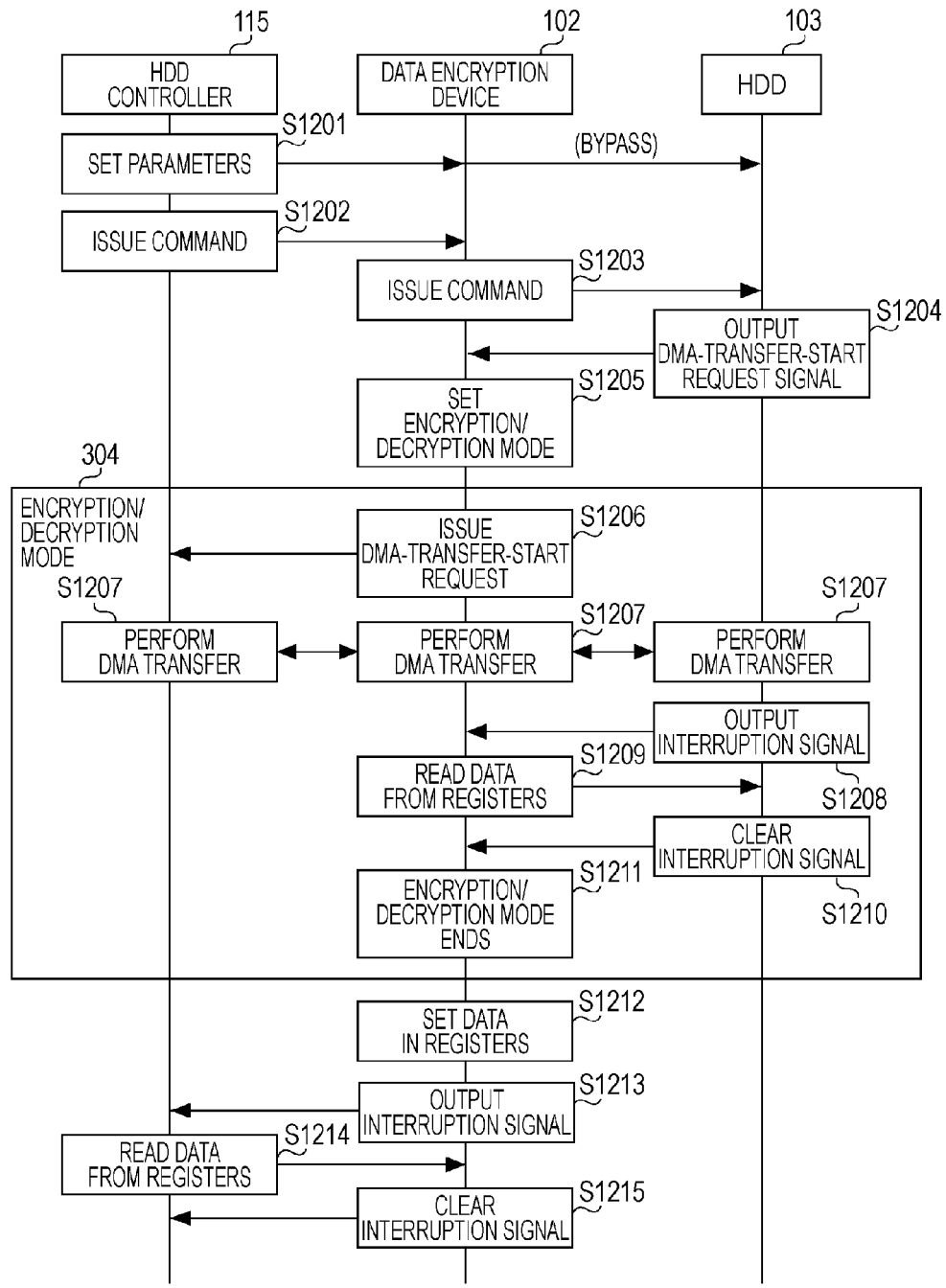
FIG. 12 is a diagram showing a sequence for commands of a direct memory access type for writing/reading data into/from an HDD.

FIG. 12 is a diagram showing a sequence for commands of the DMA transfer type to write/read data into/from the HDD 103.

As the commands of the DMA transfer type, there are two types of commands, a READ DMA command to read data from the HDD 103 and a WRITE DMA command to write data into the HDD 103. When the WRITE DMA command is executed, the data encryption device 102 encrypts data that is to be written into the HDD 103. When the READ DMA command is executed, the data encryption device 102 decrypts data that is read from the HDD 103.

When the HDD controller 115 issues a DMA transfer command, the HDD controller 115 sets parameters in registers of the HDD 103 (step S1201), and sets the DMA transfer command (step S1202).

The DMA transfer command is checked by the data encryption device 102 once, and transferred to the HDD 103 (step S1203). The HDD 103 prepares DMA transfer. When preparation is completed, the HDD 103 outputs a DMA-transfer-start request signal to the data encryption device 102 (step S1204).

When the data encryption device 102 receives the DMA-transfer-start request signal, the data encryption device 102 sets an internal setting corresponding to an encryption process or a decryption process, and the operation mode changes to the encryption/decryption mode 304 (step S1205). The data encryption device 102 has already recognized which process is to be performed, an encryption process or a decryption process, from the command that the HDD controller 115 issued.

Next, when the operation mode changes to the encryption/decryption mode 304, the data encryption device 102 issues a DMA-transfer-start request to the HDD controller 115 (step S1206).

After that, DMA transfer is practically performed, and the encryption process or decryption process is performed on data in the data encryption device 102 at the same time (step S1207).

When transfer of a predetermined number of pieces of data is completed, the HDD 103 outputs an interruption signal to the data encryption device 102 (step S1208). The data encryption device 102 reads data from the status register of the HDD 103, and checks the contents of the data (step S1209). The HDD 103 clears the interruption signal (step S1210). Then, DMA transfer finishes.

Next, when DMA transfer have finished, the data encryption device 102 sets an internal setting, and the operation mode changes to the normal mode 302 (step S1211). The data encryption device 102 sets data that was read from the status register and the error register of the HDD 103 in the status register and the error register of the data encryption device 102 (step S1212), and outputs an interruption signal to the HDD controller 115 (step S1213). The HDD controller 115 reads data from the status register and the error register (step S1214). When reading of data is completed, the data encryption device 102 clears the interruption signal, and the series of processes ends.

Sequence for Commands of WRITE Transfer Type (PIO WRITE)

Examples of commands to write data into the HDD 103 include a WRITE MULTIPLE (PIO WRITE) command However, in this embodiment, in order to avoid writing of unnecessary data into the HDD 103, use of the WRITE MULTIPLE (PIO WRITE) command as an available command is not permitted. Accordingly, even when the WRITE MULTIPLE (PIO WRITE) command is issued by the HDD controller 115, the data encryption device 102 determines that the command is not executable, and does not transfer the command to the HDD 103.

<Connection Detection Circuit>

Detection of disconnection of the SATA bus 104 by the connection detection circuit 114 in this embodiment will be described with reference to FIG. 13. Hereinafter, "disconnection" includes a case in which a connector of a cable of the SATA bus 104 (on the HDD controller 115 side or the data encryption device 102 side) is unplugged, and a case in which the cable is disconnected.

The connection detection circuit 114 is connected to the HDD-controller-side input/output 801 that is provided in the ATA bus selector 107. When the connection detection circuit 114 detects that the SATA bus 104 is disconnected while the encrypted data storage system is operating, the connection detection circuit 114 notifies the CPU 106 of a result of detection.

The HDD-controller-side input/output 801 includes the interface control circuit for the SATA bus 104. Communication via the SATA bus 104 is accepted in the physical layer of the interface control circuit, and initialization of the physical layer finishes. When it becomes possible to perform communication via the SATA bus 104, the interface control circuit notifies the connection detection circuit 114 of a state in which communication via the SATA bus 104 can be performed as a physical layer (PHY) communication enable signal.

When power is on, the PHY communication enable signal is output as a signal having a low level. After that, when it becomes possible to perform communication via the SATA bus 104, the level of the PHY communication enable signal is switched to a high level.

The level of the PHY communication enable signal, whose level was switched to a high level, is switched to a low level when the following states occur while a normal operation is being performed (while power is on):

(1) an ATA reset command is received from the HDD controller 115;

(2) hardware reset input for the data encryption device 102 is performed; and (3) a signal line of the SATA bus 104 is disconnected.

The connection detection circuit 114 determines that (1) and (2) from among the above-mentioned states result in performance of correct operations. The connection detection circuit 114 determines that (3) results in disconnection of the SATA bus 104, and generates a disconnection detection signal 1303, thereby notifying the CPU 106 of disconnection.

Figure 13:
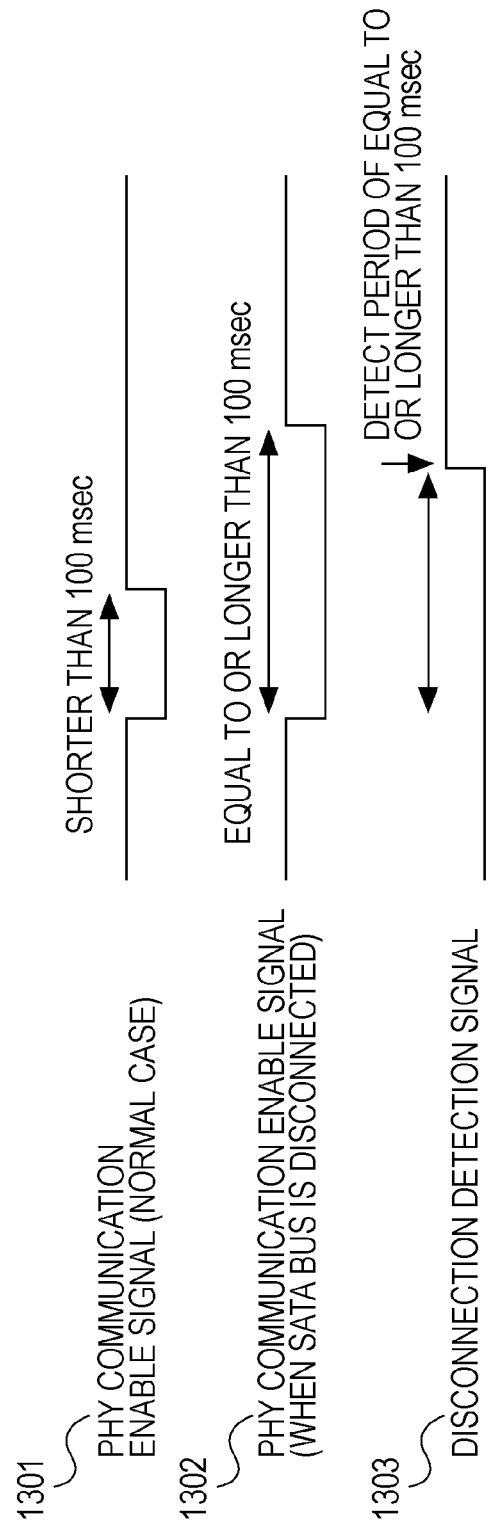
FIG. 13 is a diagram illustrating operations of a connection detection circuit.

Disconnection of the SATA bus 104 is determined by whether or not a period in which the level of the PHY communication enable signal is low while a normal operation is being performed (while power is on) is equal to or longer than a predetermined period of time as shown in FIG. 13.

In this embodiment, in cases of (1) and (2), it is supposed that a period in which the level of the PHY communication enable signal is low is shorter than 100 msec when an operation is practically performed (1301 shown in FIG. 13). Furthermore, after the cable or connector of the SATA bus 104 is unplugged, the level of the PHY communication enable signal becomes low, and it takes 100 msec or longer before the level of the PHY communication enable signal becomes high after the cable or the connection is connected again (1302 shown in FIG. 13).

As described above, in this embodiment, when a period in which the level of the PHY communication enable signal is low is equal to or longer than 100 msec, the connection detection circuit 114 determines that the SATA bus 104 is disconnected. The connection detection circuit 114 causes the level of the disconnection detection signal 1303 to be switched from a low level to a high level, thereby notifying the CPU 106 of disconnection.

Note that the three states, (1) to (3) are described as states in which the level of the PHY communication enable signal is to be switched while a normal operation is being performed (while power is on) in the embodiment of the present invention. However, the states other than (3) are not limited to the two states, (1) and (2), and other states may be added in accordance with a device.

Additionally, in this embodiment, whether or not the SATA bus 104 is disconnected is determined by whether or not a period in which the level of the PHY communication enable signal is low is equal to or longer than 100 msec. However, the predetermined period of time is not limited to 100 msec, and can be changed to a predetermined period of time that is sufficient to distinguish a state in which the SATA bus 104 is disconnected from the computer system 101 from a state in which a normal operation is performed.

Next, an operation of switching between the operation modes of the data encryption device 102 in a case in which the connection detection circuit 114 detects disconnection of the SATA bus 104 will be described.

Figure 14:
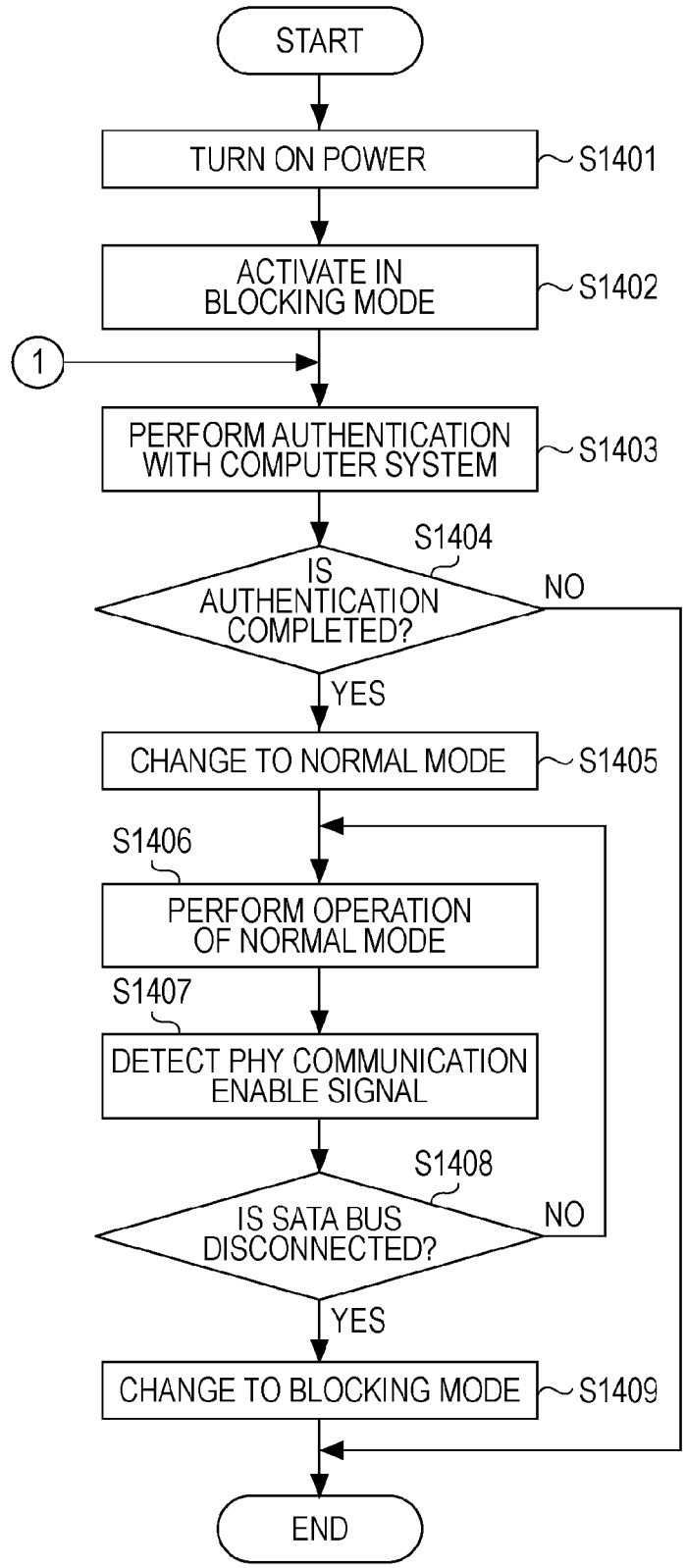
FIG. 14 is a flowchart for explaining an operation of switching between the operation modes of the data encryption device.

FIG. 14 is a flowchart showing an example of the operation of switching between the operation modes in the data encryption device 102 according to this embodiment. Processes illustrated in the flowchart are performed by the CPU 106 of the data encryption device 102.

After power is turned on (step S1401), the data encryption device 102 is activated in the blocking mode 301 (step S1402).

Then, as described with reference to the sequence diagram shown in FIG. 9, mutual authentication between the data encryption device 102 and the computer system 101 in the case of normal activation is performed (step S1403). When authentication is correctly performed (Yes in step S1404), the operation mode changes to the normal mode 302 (step S1405). In contrast, when authentication is not correctly performed, the operation mode does not change to the normal mode 302, and the flowchart ends.

While an operation of the normal mode 302 is being performed (step S1406), the connection detection circuit 114 detects the PHY communication enable signal (step S1407). It is determined on the basis of a result of detection by the connection detection circuit 114 whether or not the SATA bus 104 is disconnected (step S1408). When it is determined that the SATA bus 104 is not disconnected (No in step S1408), the process returns to step S1406, and the operation of the normal mode 302 is performed. In contrast, when it is determined that the SATA bus 104 is disconnected (Yes in step S1408), the data encryption device 102 changes the operation mode from the normal mode 302 to the blocking mode 301. Then, the data encryption device 102 performs a process of canceling authentication in order to cancel authentication of the computer system 101 (step S1409). Then, the flowchart ends.

Note that, although the operation in the case of normal activation, which is described with reference to FIG. 9, is described with reference to the flowchart shown in FIG. 14, the flowchart can be applied to the case of the initial installation, which is described with reference to FIG. 8. In this case, the process of generating seed information (step S807), the process of storing unique information (step S809), and the process of generating an encryption key (step S810), which are shown in FIG. 8, correspond to step S1403 shown in FIG. 14. The process of changing the operation mode to the normal mode 302 (step S813) shown in FIG. 8 corresponds to step S1405 shown in FIG. 14.

As described above, according to the flowchart shown in FIG. 14, when the data encryption device 102 is disconnected from the computer system 101 (the HDD controller 115), the operation mode of the data encryption device 102 changes from the normal mode 302 to the blocking mode 301. Accordingly, because it becomes impossible to read data from the HDD 103 and to decrypt the data, security of the HDD 103 can be maintained.

Figure 15:
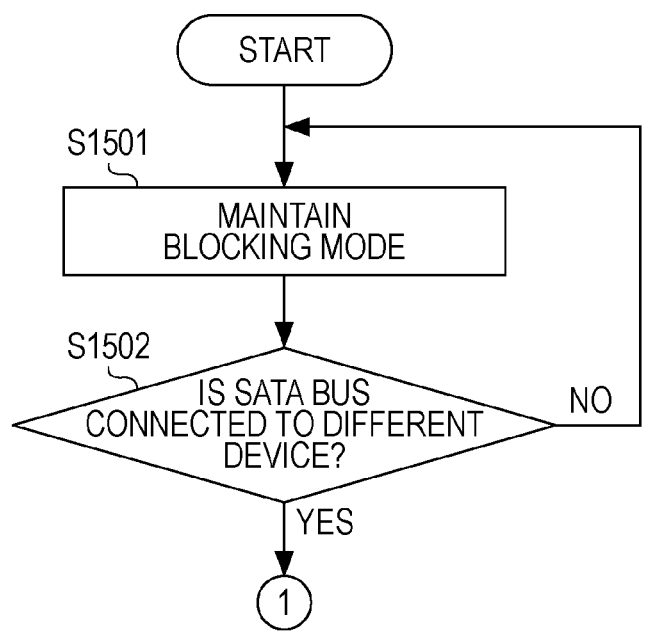
FIG. 15 is a flowchart for explaining a process in a case in which the data encryption device is connected to a different device.

FIG. 15 is a flowchart showing an example of a process that is performed by the data encryption device 102 in a case in which the SATA bus 104 is disconnected, in which the operation mode of the data encryption device 102 changes to the blocking mode 301, and in which the data encryption device 102 in the blocking mode 301 is connected to a different device. Processes illustrated in the flowchart are performed by the CPU 106 of the data encryption device 102.

The data encryption device 102 performs the process of step S1409 in the flowchart shown in FIG. 14, and the flowchart ends. The data encryption device 102 in this state starts performing the processes illustrated in the flowchart shown in FIG. 15. In step S1501, the blocking mode 301 is maintained. In step S1502, the data encryption device 102 determines whether or not the SATA bus 104 that was disconnected is connected to a device. When the SATA bus 104 is connected to a device, a signal flows on the SATA bus 104. The data encryption device 102 detects the signal, whereby the data encryption device 102 can determine that the SATA bus 104 is connected to a device. In this step, the data encryption device 102 simply determines that the SATA bus 104 is connected to a device. Accordingly, the CPU 106 of the data encryption device 102 is not able to recognize whether the connected device is the computer system 101 to which the data encryption device 102 was previously connected, or a different device. When the CPU 106 determines that the SATA bus 104 is not connected to a different device, the process returns to step S1501, and the blocking mode 301 is maintained. In contrast, when the CPU 106 determines that the SATA bus 104 is connected to a different device, the process proceeds to step S1403 in the flowchart shown in FIG. 14. The processes onward from step S1403 are performed as already described with reference to FIG. 14.

Here, when the device to which the data encryption device 102 is connected is the computer system 101 to which the data encryption device 102 was previously connected, mutual authentication (step S1403) between the data encryption device 102 and the computer system 101 is correctly performed (Yes in step S1404), and the operation mode changes to the normal mode 302 again. Thus, the data encryption device 102 returns to a state in which the data encryption device 102 had existed before the SATA bus 104 was disconnected.

In contrast, here, when the device to which the data encryption device 102 is connected is a device (for example, the different computer system 1601 shown in FIG. 17) that is different from the computer system 101, to which the data encryption device 102 was previously connected, mutual authentication (step S1403) between the data encryption device 102 and the device is not correctly completed (No in step S1404). Thus, the operation mode of the data encryption device 102 does not changes to the normal mode 302. The reason for this is that authentication is not correctly performed unless the destination of connection is the computer system 101 from which the unique information was obtained in the case of the initial installation that is described with reference to FIG. 8.

With performance of the processes illustrated in FIGS. 14 and 15, when the computer system 101 to which the SATA bus 104 should be connected is replaced with a different device other than the computer system 101, the data encryption device 102 does not decrypt encrypted data that is stored in the HDD 103, or transfer the decrypted data to the device that is connected after replacement. Thus, the confidentiality of the data that is stored in the HDD 103 can be maintained.

<Other Embodiment of Connection Detection Circuit>

Figure 16:
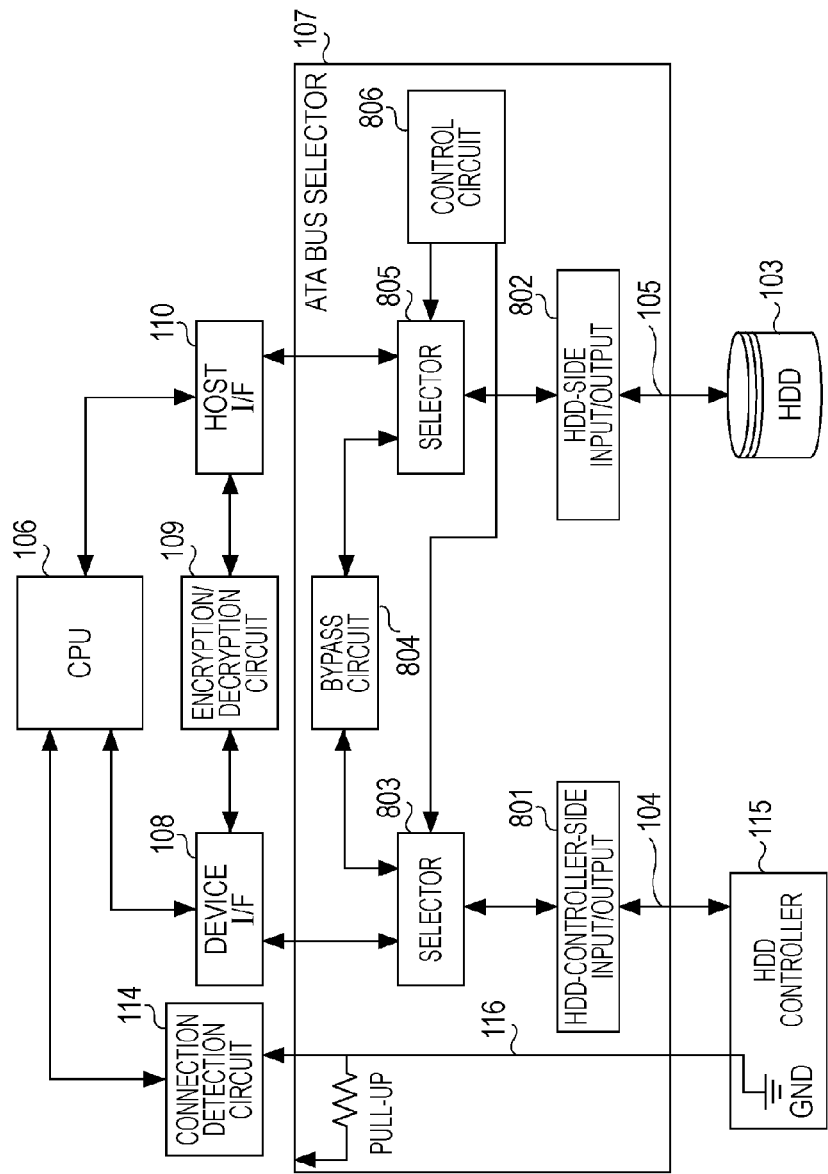
FIG. 16 is a diagram showing another example of the hardware configuration of the ATA bus selector.

Furthermore, in the above-described embodiment, the connection detection circuit 114 detects disconnection of the SATA bus 104 by using a disconnection time of the PHY communication enable signal as shown in FIG. 13. However, other detection methods may be used. FIG. 16 is a diagram showing another example of the hardware configuration of the ATA bus selector 107. The configuration shown in FIG. 4 is replaced with the configuration of shown in FIG. 16, thereby configuring the data encryption device 102 according to another embodiment. In FIG. 16, elements that are the same as those in FIG. 4 are denoted by the same reference numerals, and a description thereof is omitted. Referring to FIG. 16, a connection detection signal 116 for the SATA bus 104 is provided, and the connection detection circuit 114 may detect change in the connection detection signal 116, whereby a physical state of connection of the SATA bus 104 can be detected. Referring to FIG. 16, the connection detection circuit 114 controls the connection detection signal 116 so that a low level of the connection detection signal 116 is detected in a case in which an interface is plugged and a high level of the connection detection signal 116 is detected in a case in which the interface is unplugged. However, when another detection signal is provided, the method for detecting connection/disconnection is not limited thereto. Moreover, a detection signal may be directly connected to the CPU 106 without the connection detection circuit 114.

Additionally, in the-above-described embodiment, connection of the SATA bus 104 between the data encryption device 102 and the computer system 101 is described as an example. However, the present invention is not limited to the embodiment. For example, the configuration in the embodiment may be applied to a storage device, a mobile terminal, a mobile music player, a mobile video reproducing device, a mobile game machine, or the like instead of the data encryption device 102. Furthermore, the configuration in the embodiment may be applied to a copier, a printer, a facsimile machine, a multifunction device, a game machine, or the like instead of the computer system 101. When a copier, a printer, a facsimile machine, or a multifunction device is used as the computer system 101, encrypted image data or encrypted document data is stored in the HDD 103. Moreover, any one of other interfaces supporting hot swapping (the USB, the IEEE1394 interface, a network, and a personal computer (PC) card) may be used instead of the SATA bus 104. Additionally, any one of other storage devices such as flash memories, and peripheral devices may be used instead of the HDD 103.

Other Embodiments

In another embodiment, a control program for realizing each function of the above-described embodiment is directly or remotely supplied to a system or a device, and a program code of the supplied program is read and executed by a computer that is included in the system or the like, thereby also achieving the present invention.

Accordingly, in order to realize functions and processes of the embodiment of the present invention on the computer or the device, the program code of the control program that is to be installed into the computer or the device may realize the present invention. In other words, the control program for realizing the functions and processes may be provided according to another embodiment.

In such a case, the form of the program, such as object code, a program that is executed by an interpreter, or script data that is to be supplied to an operation system (OS), does not matter as long as the program has the functions.

Examples of a recording medium for supplying the program include a flexible disc, a hard disk, an optical disc, a magneto-optical disc (MO), a CD-ROM, a CD-R, a CD-RW, and so forth. Additionally, the examples include a magnetic tape, a non-volatile memory card, a ROM, a DVD (a DVD-ROM or a DVD-R), and so forth.

Furthermore, the program may be downloaded from a web site on the Internet or an intranet by using a browser of a client computer. In other words, the program according to the embodiment of the present invention, or a file in which the program is compressed and which has an automatic install function may be downloaded into the recording medium such as a hard disk. Additionally, the program code included in the program according to the embodiment of the present invention is divided into files, and the respective files are downloaded from web sites that are different from one another, thereby realizing the program. In other words, a world wide web (WWW) server that causes users to download a program file for realizing the functions and the processes of the embodiment of the present invention with a computer may be an element in an embodiment of the present invention.

Moreover, the program according to the embodiment of the present invention may be encrypted, stored in a storage medium such as a CD-ROM, and distributed to users. In this case, only a user satisfying a predetermined condition may be allowed to download key information for decryption from a web site via the Internet or an intranet, and the encrypted program may be decrypted using the key information. The decrypted program may be executed and installed into a computer.

Furthermore, the functions of the above-described embodiment may be realized by executing the read program with the computer. Note that, an OS that operates on the computer may practically perform some of or all of the processes in accordance with instructions of the program. As a matter of course, also in this case, the functions of the above-described embodiment can be realized.

Additionally, the program that is read from the recording medium may be written into a memory that is provided on a functionally expanded board which is inserted into the computer, or that is provided in a functionally expanded unit which is connected to the computer. A CPU that is provided on the functionally expanded board or in the functionally expanded unit or the like may practically perform some of or all of the processes. In this manner, the functions of the above-described embodiment can also be realized.

Figure 17:
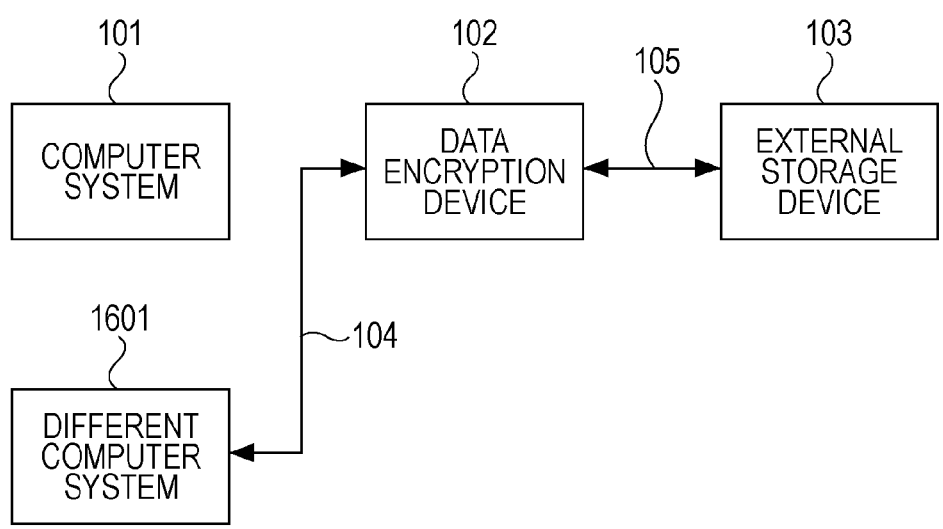
FIG. 17 is a diagram showing an example of connection change of an interface supporting hot swapping.

As described above, according to the embodiments, when the data encryption device 102 detects disconnection caused by unplugging the cable of the SATA bus 104 or the like while the data encryption device 102 is performing an operation in the normal mode 302, the data encryption device 102 is not able to access the HDD 103 unless the data encryption device 102 performs authentication between the data encryption device 102 and the computer system 101 again. Accordingly, as shown in FIG. 17, when the cable of the SATA bus 104 is connected to the different computer system 1601 or the like, authentication is not correctly completed. Thus, the data encryption device 102 is not able to cause the operation mode to change to the normal mode 302, and a leakage of data that is stored in the HDD 103 can be avoided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-064252, filed Mar. 13, 2008, which is hereby incorporated by reference herein in its entirety.

The invention claimed is:

1. A data processing device comprising:
a first interface configured to connect the data processing device to an multifunction printer, wherein the first interface is a Serial Advanced Technology Attachment cable;
an authentication unit configured to perform a process for authenticating the multifunction printer which is connected via the first interface;
a control unit configured to control, in response to correct performance of authentication of the multifunction printer by the authentication unit, the data processing device so that transfer of data to the multifunction printer is enabled;
a determination unit configured to determine a state of connection of the data processing device to the multifunction printer via the first interface; and
a change unit configured to, on the basis of determination by the determination unit that the data processing device is not connected to the multifunction printer via the first interface, change to being in a state in which the authentication unit does not authenticate the multifunction printer; and
a second interface configured to connect the data processing device to a storage device,
wherein, when authentication of the multifunction printer is not correctly performed by the authentication unit, the control unit controls the data processing device so that the data processing device operates in a blocking mode in which the data processing device blocks an access request to the storage device which has been received by the data processing device from the multifunction printer via the first interface, and controls the data processing device, in response to correct performance of authentication of the multifunction printer by the authentication unit, so that the data processing device operates in a normal mode in which processing of data that has been received from the storage device and transfer of the data to the multifunction printer are permitted;
wherein the data processing device is able to operate so as to encrypt image data that has been transferred from the multifunction printer, to store the encrypted image data in the storage device, and to transfer the decrypted image data to the multifunction printer.

2. The data processing device according to claim 1, wherein the data processing device receives encrypted data from the storage device via the second interface, and wherein the control unit decrypts the encrypted data that has been received from the storage device in the normal mode, and transfers the decrypted data to the multifunction printer.

3. The data processing device according to claim 1, wherein the control unit controls the data processing device, on the basis of determination by the determination unit in the normal mode that the data processing device is not connected to the multifunction printer via the first interface, so as to change to being in the blocking mode.

4. The data processing device according to claim 1, wherein the determination unit determines, in response to no performance of transfer of data between the data processing device and the multifunction printer via the first interface in a predetermined period of time, that the data processing device is not connected to the multifunction printer via the first interface.

5. The data processing device according to claim 1, further comprising a detection unit that detects whether or not the data processing device is physically disconnected from the multifunction printer via the first interface, wherein the determination unit determines a state of connection of the data processing device to the multifunction printer via the first interface on the basis of a result of detection by the detection unit.

6. The data processing device according to claim 1, further comprising a unique information storage unit that stores unique information which is information unique to multifunction printer that is to be authenticated by the authentication unit, wherein the authentication unit performs a process for authenticating, using the unique information that is stored in the unique information storage unit, the multifunction printer that is connected via the first interface, and, when the multifunction printer does not correspond to the unique information, the authentication unit does not authenticate the multifunction printer.

7. The data processing device according to claim 6, wherein, when the authentication unit does not authenticate the multifunction printer, the control unit controls the data processing device so that a limitation on transfer of data to the multifunction printer is imposed.

8. The data processing device according to claim 1, wherein the authentication unit performs, on the basis of determination by the determination unit that the data processing device changes from being in a state in which the data processing device is not connected to the multifunction printer via the first interface to being in a state in which the data processing device is connected to the multifunction printer via the first interface, the process for authenticating the multifunction printer which is connected via the first interface.

9. The data processing device according to claim 1, wherein the first interface is an interface that supports hot swapping.

10. A data processing device that is connected to an multifunction printer via a first interface, and that is connected to a storage device via a second interface, the data processing device comprising:
a control unit configured to control the data processing device so that the data processing device is able to operate at least in a normal mode, in which data that has been received from the storage device is processed and the data is transferred to the multifunction printer, or a blocking mode, in which the data processing device blocks an access request to the storage device which has been received by the data processing device from the multifunction printer via the first interface, as an operation mode of the data processing device;
a determination unit configured to determine a state of connection of the data processing device to the multifunction printer via the first interface; and
a change unit configured to change, on the basis of determination by the determination unit in the normal mode that the data processing device is not connected to the multifunction printer via the first interface, the operation mode of the data processing device from the normal mode to the blocking mode, to maintain the blocking mode in a case where the data processing device is connected to an apparatus different from the multifunction printer via the first interface after the operation mode is changed to the blocking mode, and to change, in a case where the data processing device is connected to the multifunction printer via the first interface after the operation mode is changed to the blocking mode, the operation mode from the blocking mode to the normal mode;
wherein the data processing device is able to operate so as to encrypt image data that has been transferred from the multifunction printer, to store the encrypted image data in the storage device, and to transfer the decrypted image data to the multifunction printer.

11. A method for controlling a data processing device, the method comprising the steps of:
connecting, via a first interface, the data processing device to an multifunction printer, wherein the first interface is a Serial Advanced Technology Attachment cable;
performing a process for authenticating the multifunction printer which is connected via the first interface;
controlling, in response to correct performance of authentication of the multifunction printer by the authentication unit, the data processing device so that transfer of data to the multifunction printer is enabled;
determining a state of connection of the data processing device to the multifunction printer via the first interface; and
cancelling authentication of the multifunction printer on the basis of determining that the data processing device is not connected to the multifunction printer via the first interface; and
connecting, via a second interface, the data processing device to a storage device,
wherein, when authentication of the multifunction printer is not correctly performed by the authentication unit, the control unit controls the data processing device so that the data processing device operates in a blocking mode in which the data processing device blocks an access request to the storage device which has been received by the data processing device from the multifunction printer via the first interface, and controls the data processing device, in response to correct performance of authentication of the multifunction printer by the authentication unit, so that the data processing device operates in a normal mode in which processing of data that has been received from the storage device and transfer of the data to the multifunction printer are permitted;
wherein the data processing device is able to operate so as to encrypt image data that has been transferred from the multifunction printer, to store the encrypted image data in the storage device, and to transfer the decrypted image data to the multifunction printer.

12. A method for controlling a data processing device that is connected to an multifunction printer via a first interface, and that is connected to a storage device via a second interface, the method comprising the steps of:
controlling the data processing device so that the data processing device is able to operate at least in a normal mode, in which data that has been received from the storage device is processed and the data is transferred to the multifunction printer, or a blocking mode, in which the data processing device blocks an access request to the storage device which has been received by the data processing device from the multifunction printer via the first interface, as an operation mode of the data processing device;

determining a state of connection of the data processing device to the multifunction printer via the first interface; and changing, on the basis of determining in the normal mode that the data processing device is not connected to the multifunction printer via the first interface, the operation mode of the data processing device from the normal mode to the blocking mode, maintaining the blocking mode in a case where the data processing device is connected to an apparatus different from the multifunction printer via the first interface after the operation mode is changed to the blocking mode, and changing, in a case where the data processing device is connected to the multifunction printer via the first interface after the operation mode is changed to the blocking mode, the operation mode from the blocking mode to the normal mode;

wherein the data processing device is able to operate so as to encrypt image data that has been transferred from the multifunction printer, to store the encrypted image data in the storage device, and to transfer the decrypted image data to the multifunction printer.

13. A non-transitory computer-readable storage medium storing a control program for causing a data processing device to perform a control method, the control method comprising the steps of:

connecting, via a first interface, the data processing device to an multifunction printer, wherein the first interface is a Serial Advanced Technology Attachment cable;

performing a process for authenticating the multifunction printer which is connected via the first interface;

controlling, in response to correct performance of authentication of the multifunction printer by the authentication unit, the data processing device so that transfer of data to the multifunction printer is enabled;

determining a state of connection of the data processing device to the multifunction printer via the first interface; and cancelling authentication of the multifunction printer on the basis of determining that the data processing device is not connected to the multifunction printer via the first interface; and connecting, via a second interface, the data processing device to a storage device, wherein, when authentication of the multifunction printer is not correctly performed by the authentication unit, the control unit controls the data processing device so that the data processing device operates in a blocking mode in which the data processing device blocks an access request to the storage device which has been received by the data processing device from the multifunction printer via the first interface, and controls the data processing device, in response to correct performance of authentication of the multifunction printer by the authentication unit, so that the data processing device operates in a normal mode in which processing of data that has been received from the storage device and transfer of the data to the multifunction printer are permitted;

wherein the data processing device is able to operate so as to encrypt image data that has been transferred from the multifunction printer, to store the encrypted image data in the storage device, and to transfer the decrypted image data to the multifunction printer.

14. A non-transitory computer-readable storage medium storing a control program for causing a data processing device to perform a control method, the data processing device being connected to an multifunction printer via a first interface, and being connected to a storage device via a second interface, the control method comprising the steps of:

controlling the data processing device so that the data processing device is able to operate at least in a normal mode, in which data that has been received from the storage device is processed and the data is transferred to the multifunction printer, or a blocking mode, in which the data processing device blocks an access request to the storage device which has been received by the data processing device from the multifunction printer via the first interface, as an operation mode of the data processing device;

determining a state of connection of the data processing device to the multifunction printer via the first interface; and changing, on the basis of determining in the normal mode that the data processing device is not connected to the multifunction printer via the first interface, the operation mode of the data processing device from the normal mode to the blocking mode, maintaining the blocking mode in a case where the data processing device is connected to an apparatus different from the multifunction printer via the first interface after the operation mode is changed to the blocking mode, and changing, in a case where the data processing device is connected to the multifunction printer via the first interface after the operation mode is changed to the blocking mode, the operation mode from the blocking mode to the normal mode;

wherein the data processing device is able to operate so as to encrypt image data that has been transferred from the multifunction printer, to store the encrypted image data in the storage device, and to transfer the decrypted image data to the multifunction printer.

* * * * *